United States Patent
Mori

(10) Patent No.: US 9,525,678 B2
(45) Date of Patent: Dec. 20, 2016

(54) NON-TRANSITORY COMPUTER READABLE MEDIUM, SERVER AND SYSTEM

(71) Applicant: Takafumi Mori, Nagoya (JP)

(72) Inventor: Takafumi Mori, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/209,111

(22) Filed: Mar. 13, 2014

(65) Prior Publication Data

US 2014/0282996 A1  Sep. 18, 2014

(30) Foreign Application Priority Data

Mar. 15, 2013 (JP) ................................ 2013-053744

(51) Int. Cl.
  *H04L 9/00* (2006.01)
  *H04L 29/06* (2006.01)
  *H04N 1/44* (2006.01)

(52) U.S. Cl.
  CPC ........ *H04L 63/0807* (2013.01); *H04N 1/4413* (2013.01); *H04N 1/4433* (2013.01); *H04L 2209/605* (2013.01)

(58) Field of Classification Search
  CPC . H04L 63/0807; H04L 2209/605; H04N 1/00; H04N 1/4433; H04N 1/4413
  USPC .......................................................... 726/10
  See application file for complete search history.

(56) References Cited

U.S. PATENT DOCUMENTS

| 2001/0048375 | A1 | 12/2001 | Maruyama et al. |
| 2003/0137277 | A1 | 7/2003 | Mori et al. |
| 2004/0093523 | A1* | 5/2004 | Matsuzaki .............. G06F 21/10 726/10 |

(Continued)

FOREIGN PATENT DOCUMENTS

| CN | 100527142 C | 8/2009 |
| JP | 2006004020 A | 1/2006 |
| JP | 2011-159232 A | 8/2011 |

OTHER PUBLICATIONS

Extended European Search Report issued on Nov. 20, 2014 in Application No. 14158918.4.

(Continued)

*Primary Examiner* — Jung Kim
*Assistant Examiner* — Thomas Ho
(74) *Attorney, Agent, or Firm* — Banner & Witcoff, Ltd.

(57) ABSTRACT

A server may store one or more accounts. Each account may be associated with an authentication code and a total number of information devices that are allowed to be registered. The authentication codes may be provided to users for registering information devices. The information device may transmit a connection request, including an entered authentication code, to a server. Upon receiving the connection request, the server may determine whether to register the particular information device. The server may determine whether the information device is allowed to be registered based on registerable information, which is associated with an account that is associated with the received authentication code and which represents a remaining number of information devices that are allowed to be registered using the associated authentication code. If the information device is allowed to be registered, the server may send authentication information to the information device, so it may transmit state information.

23 Claims, 13 Drawing Sheets

(56) References Cited

U.S. PATENT DOCUMENTS

| | | |
|---|---|---|
| 2005/0152387 A1 | 7/2005 | Utsunomiya et al. |
| 2005/0157848 A1 | 7/2005 | Miyauchi et al. |
| 2009/0055241 A1 | 2/2009 | Chen et al. |
| 2009/0292767 A1 | 11/2009 | Wen |
| 2010/0273455 A1 | 10/2010 | Tamura et al. |
| 2011/0001999 A1* | 1/2011 | Nanaumi .................... 358/1.14 |
| 2011/0075204 A1 | 3/2011 | Yoshimura |
| 2011/0222102 A1 | 9/2011 | Ito |
| 2012/0246502 A1 | 9/2012 | Koga |
| 2012/0303323 A1 | 11/2012 | Ha et al. |
| 2012/0307283 A1 | 12/2012 | Hamada |

OTHER PUBLICATIONS

Jan. 26, 2016—(US) Notice of Allowance—U.S. Appl. No. 14/207,973.
Feb. 16, 2016—(JP) Office Action—App 2013-053744.
Jul. 14, 2016—(US) Notice of Allowance—U.S. Appl. No. 14/207,973.
Jul. 25, 2016—(CN) Office Action—App 201410095407.7.

* cited by examiner

Fig.2

| Account: 1 | | | | | |
|---|---|---|---|---|---|
| | | | 241 | Device ID | Serial number |
| PIN code | Flag information | Period information | Number information | X01234 | 0001 |
| 123203438 479572983 | 0 | 30-day | 100 | X56789 | 0002 |
| | | | | Y01234 | 0003 |
| | | | | Y56789 | 0004 |

242

NON-TRANSITORY COMPUTER READABLE MEDIUM, SERVER AND SYSTEM

CROSS-REFERENCE TO RELATED APPLICATION

This application claims priority from Japanese Patent Application No. 2013-053744, filed on Mar. 15, 2013, which is incorporated herein by reference in its entirety.

TECHNICAL FIELD

Aspects of the disclosure relate to a server and a network system that acquire information, which is stored in an information device, from the information device by communicating with a plurality of information devices, such as an image forming device.

BACKGROUND

A server and a network system for acquiring information, which is stored in an information device, from the information device by communicating with a plurality of information devices, such as an image forming device are known. For example, a system such that a service center acquires information related to a state of a consumable supply of goods in an image forming device from the image forming device is well known. In the known system, the service center receives, from the image forming device, an order request message including type information for identifying a consumable supply of goods and notification identification information for identifying an order source. The order request message is for ordering a consumable supply of goods. The service center executes a procedure for delivering the consumer goods based on the received type information and notification identification information.

SUMMARY

Authentication codes may be used for authenticating the information device when the server and the information device start to communicate with each other. The authentication codes may be decided by the server. An authentication information may include, for example, a personal identification number (PIN). Generally, the authentication code is transmitted from the information device to the server, and the server executes an authentication procedure for authenticating the information device. After authenticating, the information device can communicate with the server. Thus, a single authentication code might only be used for authenticating one information device.

When one authentication code is used for authenticating just one information device, a plurality of authentication codes for authenticating each of the plurality of the information devices by the server have to be stored in the server. Further, if a different authentication code is needed to set up each information device, then setting up a plurality of information devices may be a tedious task. For example, if a sales person is responsible for registering a plurality of information devices, he/she may find it difficult to manage the plurality of authentication codes needed to register the plurality of information devices.

Aspects of the disclosure provide a server and a system that are configured to make it easier to register a plurality of the information devices.

Aspects described herein may provide a non-transitory computer-readable medium storing computer-readable instructions that, when executed by at least one processor of a server, cause the server to store one or more accounts in memory (which may include memory in the server and/or other memory accessible to the server). For example, the server may store a first account and a second account. The first account may be associated with a first authentication code and first number information indicating a first total number of information devices that are allowed to be registered using the first authentication code. Meanwhile, the second account may be associated with a second authentication code and second number information indicating a second total number of information devices that are allowed to be registered using the second authentication code. In some cases, the first total number may be greater than the second total number. For example, the first total number may be 100 while the second total number is 1. Further, the computer-readable instructions, when executed, may cause the server to receive, from a first information device, a connection request comprising a particular authentication code (e.g., the first authentication code, second authentication code, or another authentication code). Then, the computer-readable instructions, when executed, may cause the server to identify one of the first account and the second account based on the particular authentication code; and acquire registerable information associated with the identified account. Moreover, the computer-readable instructions, when executed, may cause the server to determine whether the first information device is allowed to be registered based on the registerable information. The registerable information may represent a remaining number of a total number of information devices that are allowed to be registered using the first authentication code. The computer-readable instructions, when executed, may also cause the server to transmit authentication information (e.g., token information or other encryption data) to the first information device to allow the first information device to communicate with the server in response to determining that the first information device is allowed to be registered.

According to other aspects of the disclosure, a server may be provided. The server may comprise at least one processor, and a memory storing computer-readable instructions therein. These computer-readable instructions, when executed by the at least one processor, may cause the server to perform similar functions that the server may perform when the instructions stored on the computer-readable medium described above are executed.

According to still other aspects of the disclosure a system may be provided. The system may comprise a server and an information device. The server may comprise at least one first processor and a first memory. The first memory may store first computer-readable instructions therein that, when executed by the at least one first processor, cause the server to perform similar functions described above. The information device may comprise at least one second processor and a second memory. The second memory may store second computer-readable instructions therein that, when executed by the at least one second processor, cause the information device to receive authentication codes. For example, a user may input an authentication code through an input device of the information device. The second computer-readable instructions, when executed, may also cause the information device to transmit, to the server, a connection request comprising a particular authentication code (e.g., an inputted authentication code). The second computer-readable instructions may further cause the information device to receive the authentication information (e.g., token information) from the server. The second computer-readable instructions may then cause the information device to communicate with the server using the received authentication information. For example, the information device may communicate device state information indicating a state of a consumable supply of goods to the server.

This summary is not intended to identify critical or essential features of the disclosure, but instead merely summarizes certain features and variations thereof. Other objects, features, and advantages will be apparent to persons of ordinary skill in the art from the following detailed description of the disclosure and the accompanying drawings.

BRIEF DESCRIPTION OF THE DRAWINGS

Aspects of the disclosure are illustrated by way of example and not by limitation in the accompanying figures in which like reference characters indicate similar elements.

FIG. 2 is an example of a first table 241 and a second table 242 according to one or more aspects of the disclosure.

DETAILED DESCRIPTION OF EXAMPLE EMBODIMENTS

Figure 1:
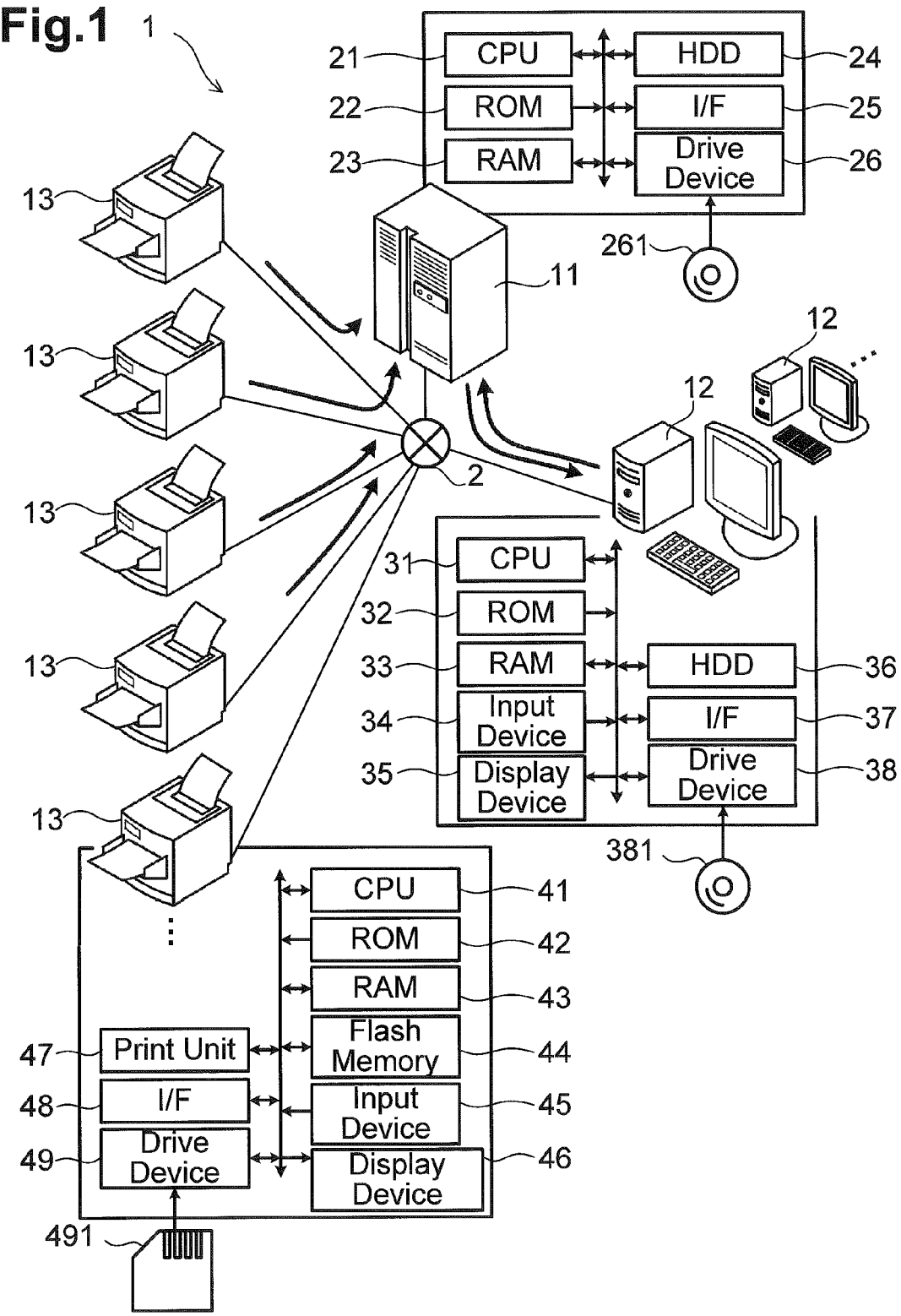
FIG. 1 depicts an example of a configuration of a network system 1 and a block diagram depicting an example electrical configuration of a server 11, information processing apparatus 12, and information device 13 according to one or more aspects of the disclosure.

For a more complete understanding of the present disclosure, needs satisfied thereby, and the objects, features, and advantages thereof, reference now is made to the following descriptions taken in connection with the accompanying drawings.

Hereinafter, illustrative embodiments will be described in detail with reference to the accompanying drawings. The drawings will be referred to in order to explain technical features that may be adopted by the aspects of the disclosure. Configurations of devices and flowcharts of various processes depicted in the drawings do not limit the aspects of the disclosure, but merely illustrate the aspects of the disclosure. Additionally, U.S. patent application Ser. No. 14/207,973, entitled "NON-TRANSITORY COMPUTER READABLE MEDIUM, SERVER AND SYSTEM", is hereby incorporated by reference herein in its entirety.

With reference to FIG. 1, a configuration of a network system 1 will be described. The network system 1 comprises a server 11, a plurality of information processing apparatuses 12, and a plurality of information devices 13. The server 11, the plurality of the information processing apparatuses 12, and the plurality of the information devices 13 can communicate with each other via a network 2. The server 11 is, for example, a Web server. The information processing apparatus 12 is, for example, a Web server. The information device 13 is, for example, a printer configured to print an image on a printing medium. The network 2 is, for example, an Internet. The server 11 receives, from each of the plurality of the information devices 13, information which is stored in each of the plurality of the information devices 13.

The information which is stored in the information device 13 is, for example, device state information. The device state information may represent a state of the information device 13. For example, the device state information may represent an amount of printing (e.g., the number of characters, words, sheets, etc. printed) performed by the information device 13. For example, the device state information may represent a state of a consumable supply of consumer goods (e.g., ink, toner, paper, etc.) of the information device 13. For example, the device state information may represent a degree to which the consumable supply of consumer goods of the information device 13 is consumed. When the information device 13 is a printer configured to print an image by using ink, the device state information may include a value representing an amount of ink being detected by a sensor configured to detect a remaining amount of ink. When the information device 13 is a printer configured to print an image by using toner, the device state information may include a value representing an amount of toner being detected by a sensor configured to detect a remaining amount of toner. When the information device 13 is an image scanning device or a printer configured to scan data from a sheet, the device state information may represent the number of times a roller of the information device 13 has rotated to convey a printing medium (e.g., a sheet of paper). The device state information may represent any other state of the information device 13, such as a state of the printer or the image scanning device. The information device 13, for example, may be a sewing machine configured to sew an image by using a thread. The information device 13, for example, may be a scanner device configured to scan data from a sheet, or a capturing device (e.g., a camera) configured to capture data (e.g., image data).

The sever 11 is not limited to the Web server. The sever 11 may be a general PC (Personal computer), or a general server. The information processing apparatus 12 is not limited to the Web server. The information processing apparatus 12 may be a general PC (Personal computer), or a general server. The information device 13 is not limited to the printer. For example, the information device 13 may be any one of a copy machine, a facsimile machine, a scanner, a printer, and a multi-function peripheral configured to execute one or more of functions, for example, a print function, copy function, facsimile function, and scan function. In this embodiment, a terminal device which is not shown in FIG. 1 accesses the server 11 or the information processing apparatus 12 via the network. The terminal device may be a general computer. The terminal device may be also a mobile device (e.g., Personal Digital Assistant ("PDA"), or smart phone, or tablet computer, etc.).

The terminal device can use a service provided from the information processing apparatus 12, by accessing the information processing apparatus 12. More specifically, first, the server 11 may receive a plurality of the device state information from each of the plurality of the information devices 13 configured to connect to the sever 11 via the network. And then, the server 11 transmits, to the information processing apparatus 12, a plurality of the received device state information from the information device 13. When the information processing apparatus 12 receives the plurality of the device state information from the server 11, the information processing apparatus 12 makes the plurality of the device state information available for viewing by the terminal device. The server 11 may transmit, to a plurality of the information processing apparatuses 12, a plurality of the received device state information from the information device 13. In this case, each of the plurality of the information processing apparatuses 12 executes a procedure for the service.

With reference to FIG. 1, an electrical configuration of the server 11 will be described. The sever 11 comprises a central processing unit ("CPU") 21, a read-only memory ("ROM") 22, a random-access memory ("RAM") 23, a hard disk drive ("HDD") 24, a communication interface ("I/F") 25, and a drive device 26. The CPU 21, the ROM 22, the RAM 23, and the HDD 24, the communication I/F 25, and the drive device 26 may be electrically connected to each other. The CPU 21 may control the server 11. The CPU 21 may be a general processor or a specially configured processor. The ROM 22 is configured to store various programs, for example, a boot program, an operating system ("OS"), and a basic input output system ("BIOS"), for operating the server 11, and various initial setting values. The RAM 12 is configured to temporarily store various information to be used by a program, such as information related to a timer and/or a counter.

The HDD 24 may be a storage device and may be configured to store one or more programs for allowing the CPU 21 to execute a first process (see from FIG. 4 to FIG. 11). The HDD 24 may be configured to store a first table 241 and a second table 242 (see FIG. 2). The communication I/F 25 may be configured to allow the server 11 to connect to the network 2. The drive device 26 may be configured to read information from a storage medium 261. For example, the drive device 26 may read the program stored in the storage medium 261, when the server 11 starts to set up. The program may be stored in the HDD 24. In some instances, the program may be stored in a predetermined server. In this case, the program may be downloaded from the predetermined server and stored in the HDD 24 via the network 2. Instead of the HDD 24, the server 11 may comprise any one of a flash memory, a read-only memory, and a random-access memory. Instead of the HDD 24, the server 11 may comprise various memory. The server 11 may comprises a computer-readable medium, as the HDD 24. The server 11 may comprise a computer-readable storage medium, as the HDD 24. Herein, a computer-readable storage medium may refer to any structural device from which data may be read, and does not include a transitory transmission signal.

With reference to FIG. 1, an electrical configuration of the information processing apparatus 12 will be described. The information processing apparatus 12 comprises a central processing unit ("CPU") 31, a read-only memory ("ROM") 32, a random-access memory ("RAM") 33, an input device 34, a display device 35, an hard disk drive ("HDD") 36, a communication interface ("I/F") 37, and a drive device 38. The CPU 31, the ROM 32, the RAM 33, the input device 34, the display device 35, the HDD 36, the communication I/F 37, and the drive device 38 may be electrically connected to each other. The CPU 31 may control the information processing apparatus 12. The CPU 31 may be a general processor or a specially configured processor. The ROM 22 is configured to store various programs, for example, a boot program, an operating system ("OS"), and a basic input output system ("BIOS"), for operating the information processing apparatus 12, and various initial setting values. The RAM 12 is configured to temporarily store various information to be used by a program, such as information related to a timer and a counter. The information processing apparatus 12 may comprise the input device 34 and the display device 35. The input device 34, for example, may be a keyboard or mouse. The display device 35 may be any type of a display (e.g., LCD screen, touch-screen, etc.).

Figure 12:
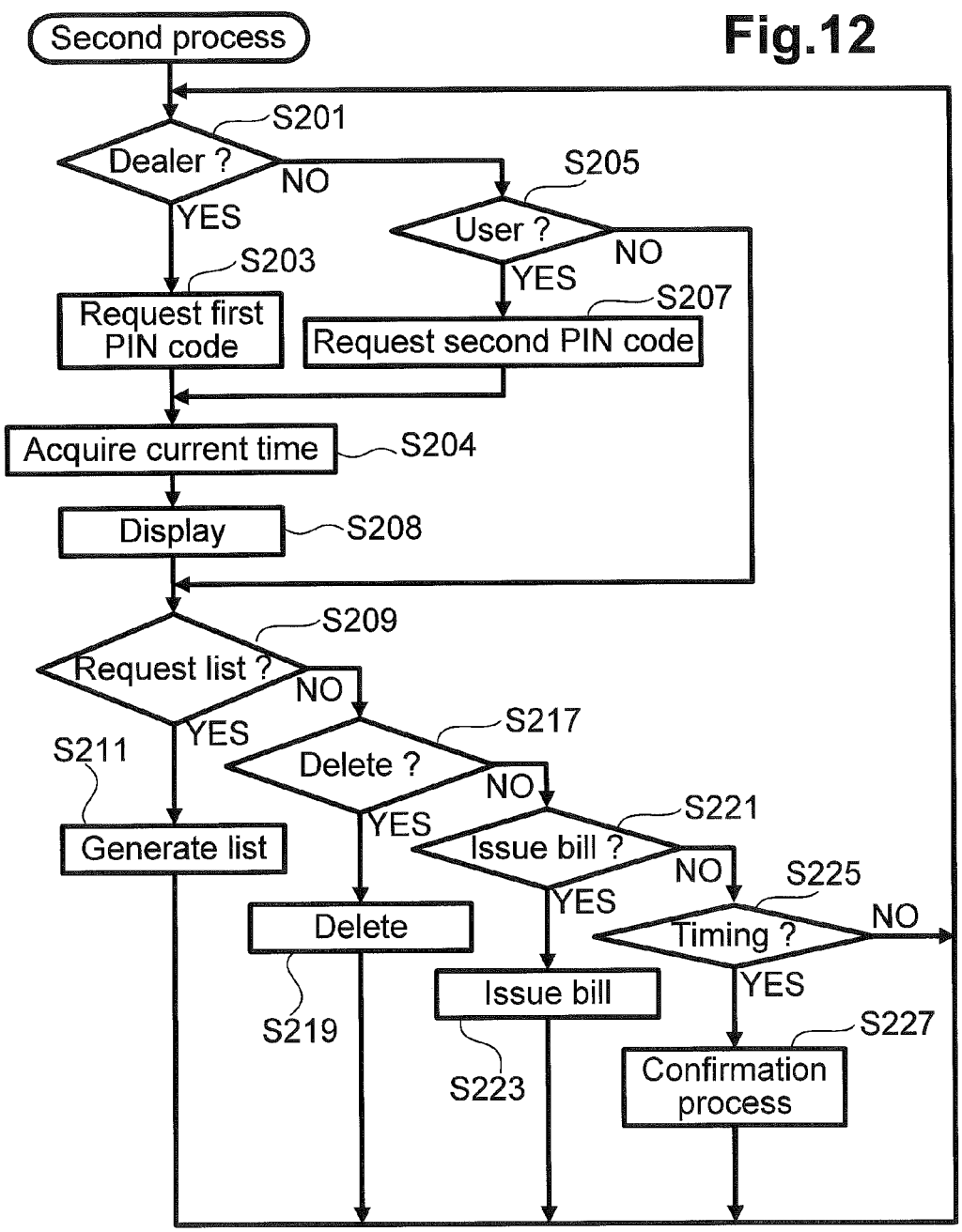
FIG. 12 is a flowchart depicting an example second process according to one or more aspects of the disclosure.

The HDD 36 may be a storage device and may be configured to store one or more programs for allowing the CPU 31 to execute a second process (see FIG. 12). The HDD 36 may be configured to store an IP address of the server 11. The HDD 36 may be configured to store, as described below in detail, account information (e.g., user identification information), number information representing the number of the information devices 13, time period information, and flag information associated with each other.

The communication I/F 37 may be configured to allow the information processing apparatus 12 to connect to the network 2. The drive device 38 may be configured to read information from a storage medium 381. For example, the drive device 38 may read the program stored in the storage medium 381. The program may be stored in the HDD 36, when the information processing apparatus 12 starts to set up. In some instances, the program may be stored in a predetermined server. In this case, the program may be downloaded from the predetermined server and stored in the HDD 36 via the network 2. Instead of the HDD 36, the information processing apparatus 12 may comprise any one of a flash memory, a read-only memory, and a random-access memory. Instead of the HDD 36, the information processing apparatus 12 may comprise various memory. The information processing apparatus 12 may comprises a computer-readable medium, as the HDD 36. The information processing apparatus 12 may comprise a computer-readable storage medium, as the HDD 36.

With reference to FIG. 1, an electrical configuration of the information device 13 will be described. The information device 13 comprises a central processing unit ("CPU") 41, a read-only memory ("ROM") 42, a random-access memory ("RAM") 43, a flash memory 44, an input device 45, a display device 46, a print unit 47, a communication interface ("I/F") 48, and a drive device 49. The CPU 41, the ROM 42, the RAM 43, the flash memory 44, the input device 45, the display device 46, the print unit 47, the communication I/F 48, and the drive device 49 may be electrically connected to each other. The CPU 41 may control the information device 13. The CPU 41 may be a general processor or a specially configured processor. The ROM 42 is configured to store various programs, for example, boot program, a basic input output system ("BIOS") for operating the information device 13, device identification ("ID"), and one or more programs for allowing the CPU 41 to execute a third process (see FIG. 13). The RAM 43 is configured to temporarily store various information to be used by a program, such as information related to a timer and/or a counter. The flash memory 44 may also be configured to store a PIN code and a serial number as described below. The flash memory is configured to store an IP address of the server 11. The input device 45 may be a touch panel or a push-button. The display device 46 may be a liquid crystal panel. The print unit 47 may be a print mechanism configured to print an image on a print medium. The communication I/F 48 may be configured to allow the information device 13 to connect to the network 2. The drive device 49 may be configured to read information from a storage medium 491.

The information processing apparatus 12 may communicate with the server 11 by using the stored IP address of the server 11 in the HDD 36, and may establish a session between the server 11 and the information processing apparatus 12. The server 11 may acquire an IP address of the information processing apparatus 12 and service identification ("ID") from the information processing apparatus 12, and store the acquired IP address and the service ID in the HDD 24 in association with each other. The server 11 can communicate with the information processing apparatus 12 identified by the service ID using the IP address, because the server 11 can identify the IP address of the information processing apparatus 12 according to the service ID. The information device 13 may establish a session between the server 11 and the information device 13 by using the stored IP address in the flash memory 44. The server 11 may acquire an IP address of the information device 13 and the device ID from the information device 13, after the information device 13 establishes the session between the server 11 and the information device 13. The information device 13 may store the acquired IP address and the device ID in the HDD 24 in association with each other. The server 11 can communicate with the information device 13 identified by the device ID using the IP address, because the server 11 can identify the IP address of the information device 13 according to the device ID. Instead of the IP address, a Uniform Resource Location ("URL") and service ID may be stored in the HDD 24 in association with each other. Instead of the IP address, a URL and device ID may be stored in the HDD 24 in association with each other.

A user (e.g., a personal user, dealer, seller, supplier, etc.) may enter an authentication code, such as a personal identification number (PIN), into the information device 13. The information device 13 may store the PIN in memory (e.g., in the RAM 43) so it may subsequently communicate with the server 11. After the information device 13 transmits the PIN to the server 11, the server 11 may determine whether to authenticate the information device based on the PIN. If the server 11 authenticates the information device, the server 11 may generate or otherwise obtain authentication information (e.g., token information). The server 11 may then provide the token to the information device so the information device 13 may communicate with the server 11. The information device 13 may then store the token. The information device 13 may then also add the token to data which it transmits to the server 11. Thus, the information device 13 may be allowed to communicate information to the server 11 via the network 2.

An example that a seller of the information device 13 delivers a plurality of the information devices 13 to a delivery place will be described. In this case, the seller has to perform a registering procedure in which the seller enters a respective PIN code into each of the plurality of information devices 13 so that each of the plurality of information devices 13 may store a particular PIN code. Each information device 13 may receive its own PIN code, and thus, the registering procedure may be a troublesome task and require a lot of time. In contrast, in accordance with aspects of this disclosure, the server 11 can generate one specific PIN code for a seller to allow the seller to authenticate the plurality of the information devices 13. Accordingly, the registering procedure to be performed by the seller may be simplified, because the seller can cause the plurality of the information devices 13 to store the one specific PIN code for authenticating the plurality of the information devices 13.

Additionally, in accordance with aspects of this disclosure, the server 11 can also generate a PIN code for authenticating a single information device 13. Accordingly, a person who regulates or manages the single information device 13 can perform the registering procedure by using the PIN code assigned for authenticating the single information device 13.

Hereinafter, a person who uses a service provided from the information processing apparatus 12 is referred to as a "system user". Hereinafter, a person who uses the information device 13 is referred to as "device user". Hereinafter, a person who delivers the information device 13 to the device user is referred to as a "dealer". However, it should be understood that when the device user or the dealer uses the service provided from the information processing device 12, the device user or the dealer may become a system user. For example, when the dealer delivers the information device 13 to the device user who contracts with the dealer, the dealer may perform the registering procedure instead of the device user. Specifically, when the device user enters into a contract with a dealer to manage a plurality of the information devices 13, the dealer may perform the registering procedure for the plurality of the information devices 13 instead of the device user. Device users may wish to contract with dealers to perform the registering procedure for information devices 13 because the registering procedure for a plurality of information devices 13 by the device user may be a troublesome task. In accordance with aspects of this disclosure, the dealer may readily perform the registering procedure by using an account of the dealer instead of using an account of the device user.

With reference to FIG. 2, the first table 241 and the second table 242 will be described. The first table and the second table are generated and stored in the HDD 24 for each account. The PIN code, the flag information, the time period information, and the number information are stored in the first table 241 in association with each other. The device ID and the serial number are stored in the second table 242 in association with each other.

Account information includes identification information which may be necessary for the system user to request generation of the PIN code to the server 11 via the information processing apparatus 12. As depicted in FIG. 2, the first table 241 and the second table 242 are associated with a common account "1". The PIN code of the first table 241 comprises a plurality of numbers.

A digit number (i.e., a number of digits) of a PIN code for setting a plurality of the information devices 13 may be longer than a digit number of a PIN code for setting one information device 13. The digit number of a PIN code for setting a plurality of the information devices 13 is referred as "first digit number". The first digit number, for example, may be an 18-digit number. The digit number of a PIN code for setting one information devices 13 is referred as "second digit number". The second digit number, for example, may be a 6-digit number.

The flag information may represent whether the device ID stored in the second table 242 may be deleted from the second table 242 or not. In some embodiments, the flag information having a "1" may represent that a device ID may be deleted from the second table 242, and thus, the device ID may be removed from an account. Meanwhile, the flag information having a "0" may represent that the device ID may not be deleted from the second table 242, and thus, the device ID might remain in an account. Generally, dealer accounts may be associated with flag information indicating that device IDs are not to be deleted (e.g., flag information "0"), while accounts of non-dealers (e.g., device users) are associated with flag information indicating that devices IDs may be deleted (e.g., flag information "1"). The device ID which is registered by using the PIN code associated with the flag information "0" may not be deleted, therefore the system user cannot delete the device ID even though the system user wishes to delete the device ID.

The period information may represent an effective period of the PIN code. The effective period of a PIN code comprising a long digit number (e.g., the first digit number) may be settable, for example, between 1 day and 30 days. The effective period of a PIN code comprising a short digit number (e.g., the second digit number) may be settable, for example, between 1 minute and 15 minutes. The number information may represent the number of registerable information devices 13. The number of the registerable information devices 13 may represent that the number of information devices 13 which are allowed to be authenticated using the corresponding PIN code (e.g., the PIN code associated with the number information in the first table 241). If, for example, a PIN code is associated with a short digit number (e.g., the second digit number), that PIN code might only be allowed to be used to authenticate one information device 13.

The device ID in the second table 242 may be unique identification information for identifying an information device 13. The device ID, for example, may be stored in the ROM 42 by a manufacture in a manufacturing process of the information device 13. For example, the device ID may be a MAC address of the information device 13. The serial number may be a sequential number for identifying each of a plurality of information devices 13. The serial number, for example, may be stored in the flash memory 44 by a manufacture of the information device 13.

The device ID and the serial number in the second table 242 are stored in the second table 242 related to the common account "1", when the information device 13 connects to the server 11 by using the PIN code in the first table related to the common account "1".

In some embodiments, the PIN code in the first table 241 may be deleted by the server 11, when the server 11 determines that the PIN code has been used to register a specified total number of information devices 13. For example, if the number information in an account is set at 100 and the PIN code associated with that account has been used to register 100 information devices 13, the PIN code may be deleted from the account by the server 11.

With reference to FIGS. 4-11, the first process executed by the CPU 21 of the server 11 will be described. The CPU 21 may read a program from the HDD 24 or other memory and execute the first process, when the server 11 is turned on.

Figure 3:
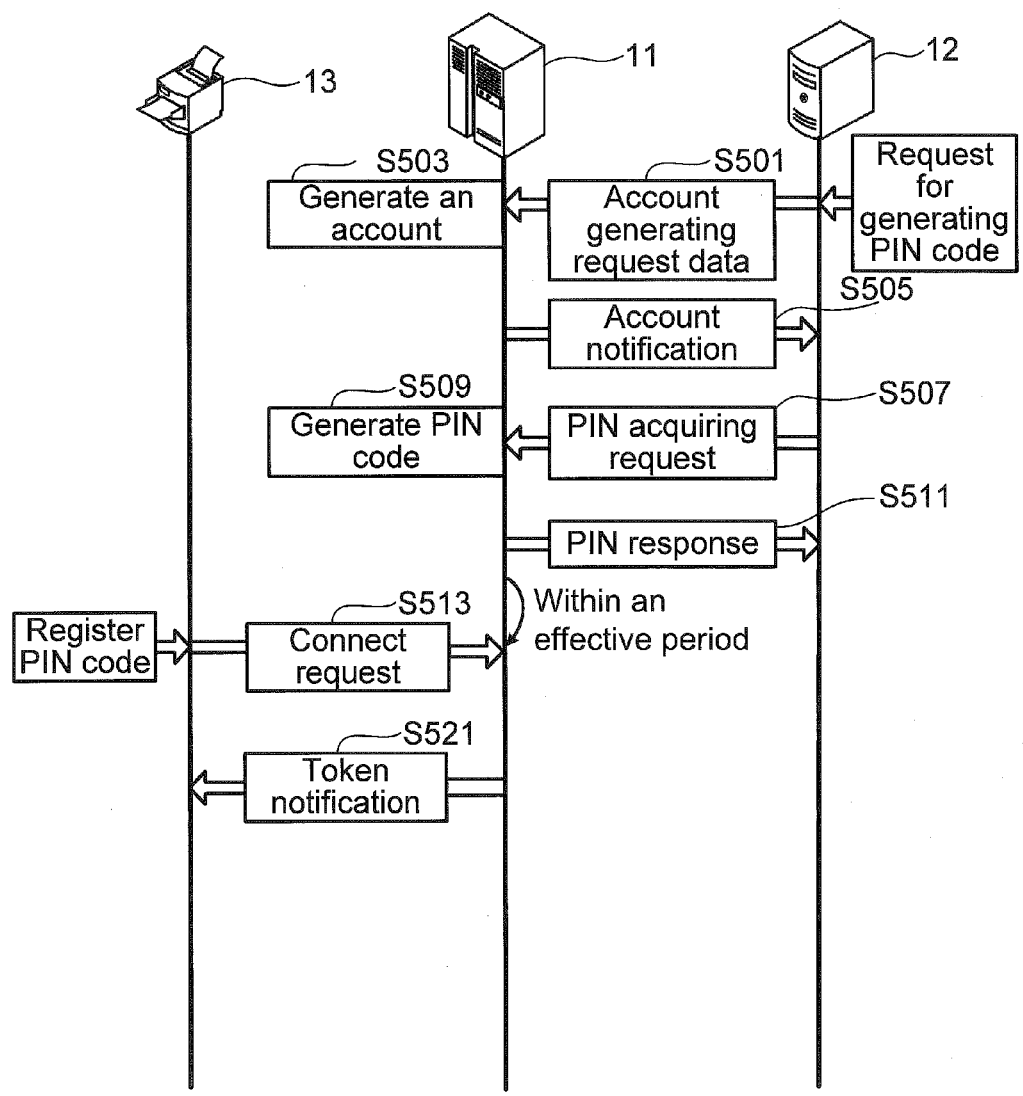
FIG. 3 is a diagram depicting an example of a communication sequence according to one or more aspects of the disclosure.
Figure 4:
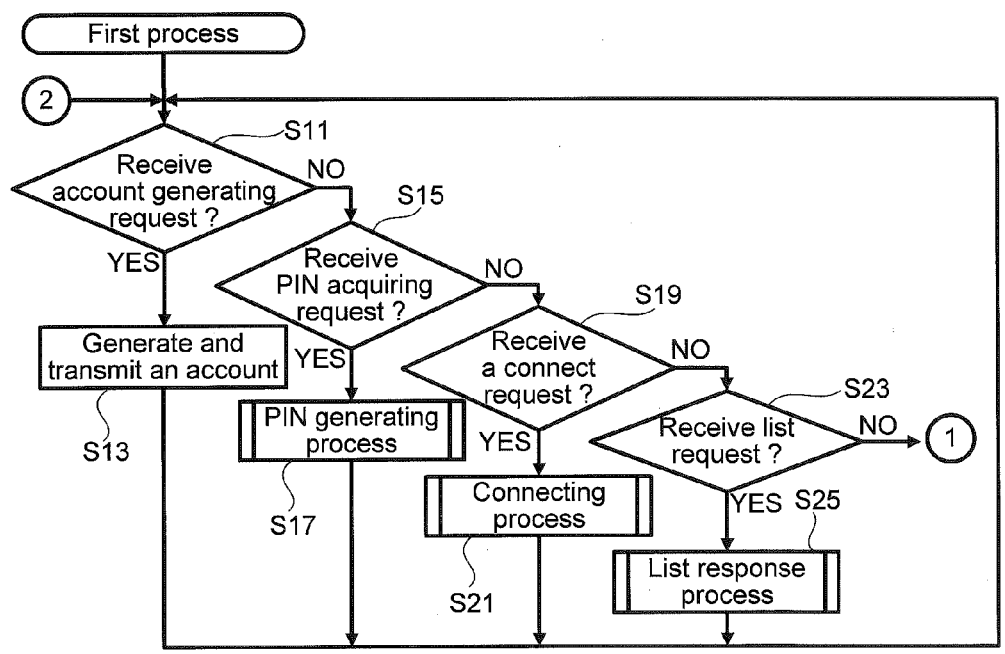
FIG. 4 is a flowchart depicting an example first process according to one or more aspects of the disclosure.

As depicted in FIG. 4, the CPU 21 may determine whether account generating request data is received from the information processing apparatus 12 or not (step S11). Further details are described with reference to FIG. 3. The account generating request data may be transmitted from the information processing apparatus 12. For example, the terminal device which can access the information processing apparatus 12 transmits, to the information processing apparatus 12 via the network 2, an instruction for request for generating an account as described in FIG. 3. The information processing apparatus 12 may transmit the account generating request data at step S501 in FIG. 3, when the information processing apparatus 12 receives the instruction for request for generating an account from the terminal device. As depicted in FIG. 4, when the CPU 21 determines that the account generating request data is received (step S11:YES), the CPU 21 may generate an account (step S13 in FIG. 4 or step S503 in FIG. 3). The CPU 21 may store the generated account in the HDD 24. The CPU 21 may transmit, to the information processing apparatus 12 which transmits the account generating request data, account notification data including the generated account (step S13 in FIG. 3 or step S505 in FIG. 3). As shown in FIG. 4, after step S13, the CPU 21 may execute step S11 again. The CPU 21 may determine that the account generating request data is not received (step S11:NO), the CPU 21 may execute step S15.

Figure 6:
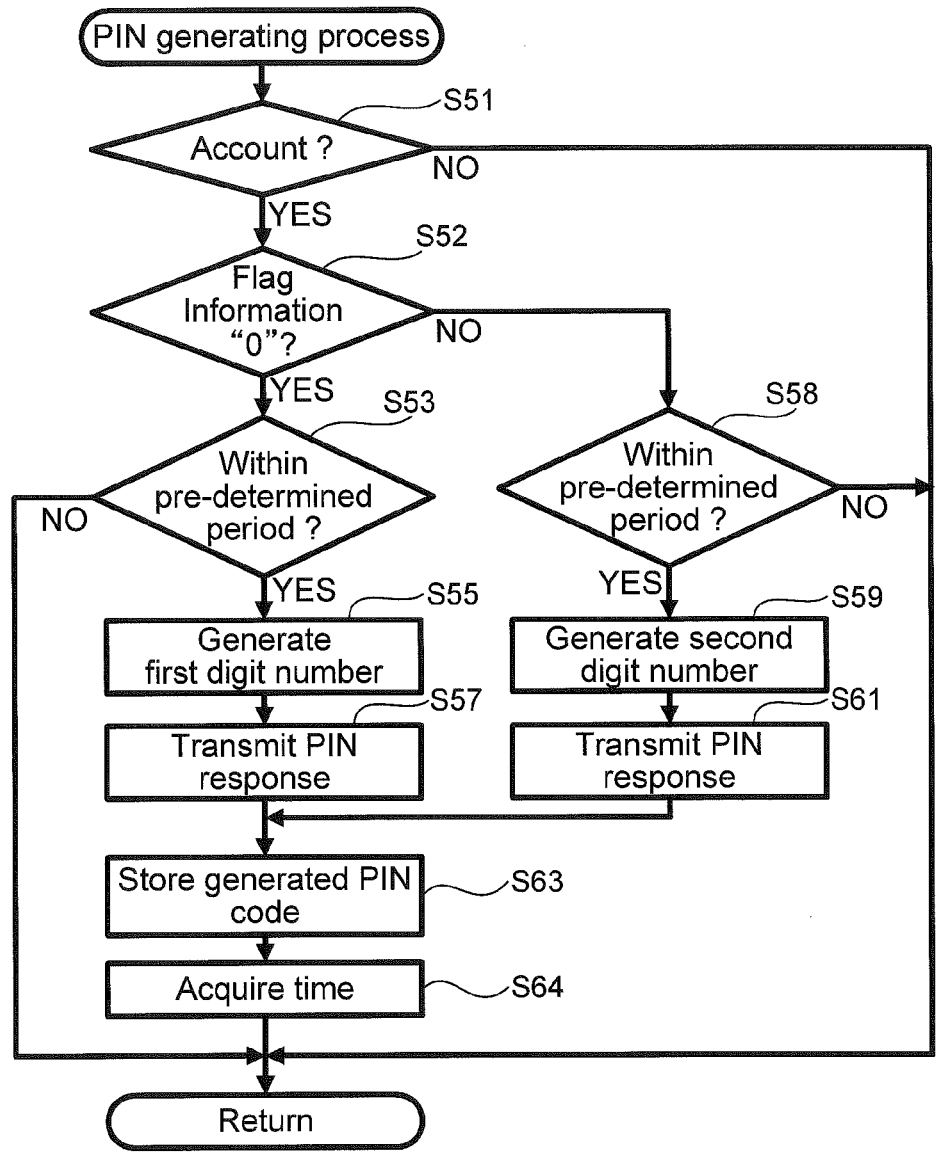
FIG. 6 is a flowchart depicting an example PIN generating process according to one or more aspects of the disclosure.

As depicted in FIG. 3, the CPU 31 of the information processing apparatus 12 may transmit PIN acquiring request data to the server 11 at any timing at step S507 of FIG. 3, after the CPU 21 of the information processing apparatus 12 receives the account notification data. The PIN acquiring request data is data that requests generating and acquiring of a PIN code by the CPU 31 of the information processing apparatus 12. The PIN acquiring request data may include the account information, the number information, the period information, and/or the flag information. If the CPU 21 determines that the account generating request data is not received (step S11:NO), and the PIN acquiring request data is received (step S15:YES), the CPU 21 may execute the PIN generating process (step S17 in FIG. 4 or step S509 in FIG. 3) as depicted in FIG. 6. If the PIN acquiring request data is not received (step S15:NO), the CPU 21 may execute step S19.

With reference to FIG. 6, the PIN generating processes executed by the CPU 21 of the server 11 will be described. The CPU 21 may determine whether the account which is included in the received PIN acquiring request data is stored in the HDD 24 or not (step S51). The CPU 21 may execute step S11 of FIG. 4 again, when the CPU 21 determines that the account is not stored in the HDD 24 (step S51:NO).

The CPU 21 may determine whether the flag information which is included in the received PIN acquiring request data represents "0" or not (step S52), when the CPU 21 determines that the account is stored in the HDD 24 (step S51:YES). When the flag information represents "0", the device ID of the information device 13 which is registered by using the PIN code is not allowed to be deleted, and therefore the system user cannot delete the device ID of the information device 13 even though the system user may wish to delete the device ID of the information device 13.

The CPU 21 may determine whether the effective period represented by the period information which is included in the PIN acquiring request data is within a predetermined period (e.g., 1 hour, 1 day, 2 days, 1 week, 1 month, etc.) or not (step S53), when the CPU 21 determines that the flag information represents "0" (step S52:YES). When the CPU 21 determines that the effective period is not within the predetermined period (e.g., the CPU 21 determines that the effective period is longer than the predetermined period) (step S53:NO), the CPU 21 may execute step S11 of FIG. 4 again.

The CPU 21 may generate a first PIN code comprising the first digit number (e.g., 18-digit) (step S55), when the CPU 21 determines that the effective period is within the predetermined period (step S53:YES). The CPU 21 may transmit, to the information processing apparatus 12 which transmits the PIN acquiring request data, PIN response data including the generated first PIN code (step S57 in FIG. 6 of step S511 in FIG. 3). The CPU 21 may store the generated first PIN code associated with the generated account at step S13 in the first table 241 (step S63). The CPU 21 also stores, the number information, the period information, and the flag information "0" which are included in the PIN acquiring request data, associated with the first PIN code in the first table 241 (step S63). The number of the registerable information device 13 represented by the number information stored in association with the first PIN code in the first table 241, is referred to as "the first number of the registerable information device 13". The effective period represented by the period information stored in association with the first PIN code in the first table 241, is referred to as "a first period". The CPU 21 may acquire time from the OS of the server 11 (step S64). Then the CPU 21 may execute step S11 of FIG. 4 again.

On the other hand, when the flag information, which is included in the PIN acquiring request data, represents "1", the system user can freely delete the device ID of the information device 13 which is registered by using the PIN code associated with the flag information "1". The CPU 21 may determine whether the effective period represented by the period information which is included in the PIN acquiring request data is within a predetermined period (ex., the predetermined period may be settable between 1 minute and 15-minutes) or not (Step S58), when the CPU 21 determines that the flag information represents "1" (step S52:NO). When the CPU 21 determines that the effective period is not with in the predetermined period (e.g., the CPU 21 determines that the effective period is longer than the predetermined period) (step S58:NO), the CPU 21 may execute step S11 of FIG. 4 again.

Alternatively, the CPU 21 may execute other methods as described below, instead of the determining process at step S52 based on the flag information. The information processing apparatus 12 may include, information indicating that the requested PIN code is either the first PIN code or the second PIN code, in the PIN acquiring request data to be transmitted to the server 11. For example, an URL for issuing the first PIN code, and an URL for issuing the second the second PIN code may be used, as the information indicating that the requested PIN code is either the first PIN code or the second PIN code. The CPU 21 may execute step S53 when the CPU 21 determines that the first PIN code is requested based on the received PIN acquiring request data, and the CPU 21 may execute step S58 when the CPU 21 determines that the second PIN code is requested based on the received PIN acquiring request data.

The CPU 21 may generate a second PIN code comprising the second digit number (e.g., 6-digit) (step S59), when the CPU 21 determines that the effective period is within the predetermined period (step S58:YES). The second digit number may be smaller than the first digit number. The CPU 21 transmits, to the information processing apparatus 12 which transmits the PIN acquiring request data, the PIN response data including the generated second PIN code (step S61 in FIG. 6 or step S511 in FIG. 3). The CPU 21 stores the generated second PIN code in association with the account generated at step S13 in the first table 241 (step S63). The CPU 21 also stores, the number information (the number of the registerable information device 13 is "1"), the period information, and the flag information "1" which are included in the PIN acquiring request data, in association with the second PIN code in the first table 241 (step S63). The number of the registerable information device 13 ("1") represented by the number information stored in association with the second PIN code in the first table 241, is referred to as "the second number of the registerable information device 13". The effective period represented by the period information stored in association with the second PIN code in the first table 241, is referred to as "a second period". The CPU 21 may acquire a time from the OS of the server 11 (step S64). This acquired time may be stored and used later to determine whether a PIN code is still effective. Then the CPU 21 may execute step S11 of FIG. 4 again.

As described above, the first PIN code can be used by the plurality of the information devices 13, because the first PIN code is associated with a plurality of the registerable information devices 13. On the other hand, the second PIN code can be used by just one information device 13, because the second PIN code is associated with one registerable information device 13.

As described above, the CPU 21 may set the first PIN code to have the first digit number that is longer than the second digit number of the second PIN code, because the effective period of the first PIN code is longer than the effective period of the second PIN code. The longer the effective period of the PIN code is, the more likely the PIN code may be decoded by someone else. For this reason, the CPU 21 may set the first digit number of the first PIN code to be longer than the second digit number of the second PIN code. Therefore, the first PIN code may be less likely to be decoded by someone else, and the long digit number can keep the first PIN code highly-confidential.

Alternatively, the CPU 21 may set the first period associated with the first PIN code to be longer than the second period associated with the second PIN code, because the first PIN code is more likely to be used for authenticating the plurality of information devices 13 than the second PIN code. Setting the first period associated with the first PIN code to be longer than the second period associated with the second PIN code may enable the dealer to perform the registering procedure adequately, even though the dealer may have to register the first PIN code to the plurality of information devices 13 and the registering procedure may take a lot of time.

When the information processing apparatus 12 receives the PIN response data, the information processing apparatus 12 acquires the PIN code (either the first PIN code or the second PIN code) which is included in the received PIN response data. The system user may perform the registering procedure (e.g., the system user may cause the information device 13 to store the acquired PIN code). The information device 13 may transmit connect request data to the server 11 at step S513 of FIG. 3, when the information device 13 receives the PIN code by the registering procedure of the system user. The connect request data is data for requesting that the information device 13 is allowed to communicate with the server 11.

Figure 7:
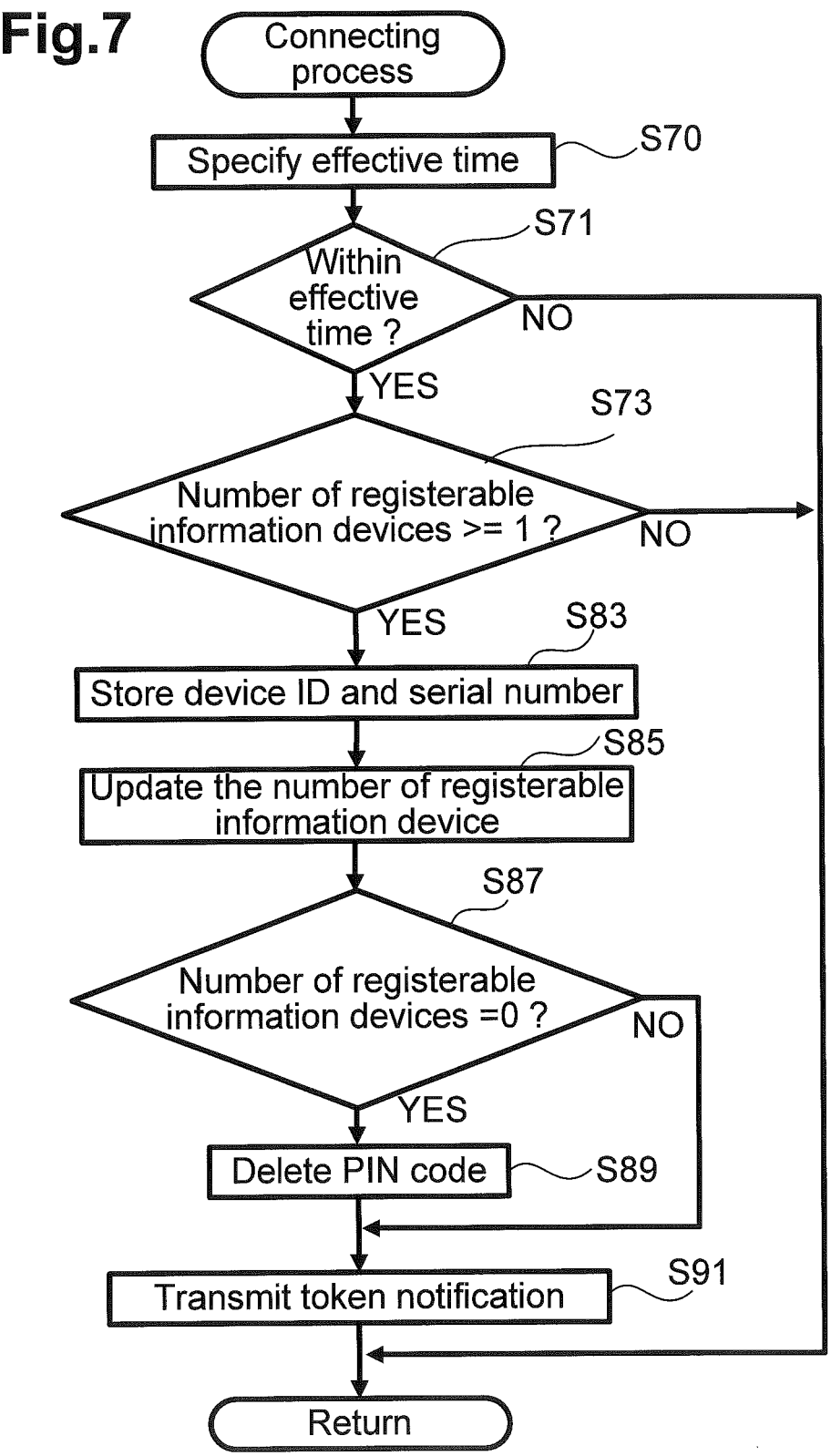
FIG. 7 is a flowchart depicting an example connecting process according to one or more aspects of the disclosure.

The CPU 21 of the server 11 may execute the connecting process of FIG. 7 (step S21), when the CPU 21 of the server 11 determines that the connect request data is received (step S19:YES).

With reference to FIG. 7, the connecting process will be described. The CPU 21 determines an effective time, based on the time acquired at step S64 of FIG. 6, and the period information associated with the PIN code which is included in the received connect request data in the first table 241 (step S70). More specifically, the effective time may be calculated by adding the effective period represented by the period information associated with the PIN code which is included in the received connect request data in the first table 241, to the time acquired at step S64 of FIG. 6. The CPU 21 may determine whether the effective time is within the effective period or not (step S71). More specifically, the CPU 21 may acquire a current time from the OS of the server 11 at step S71 and compare the current time with the effective time. The CPU 21 may determine that the PIN code is invalid and execute step S11 of FIG. 4 again, when the CPU 21 determines that the effective time is prior to the current time (step S71:NO).

On the other hand, the CPU 21 may determine that the PIN code is valid, when the CPU 21 determines that the specified effective time has not yet been reached, e.g., when the CPU 21 determines that the specified effective time will come after the current time (step S71:YES). The CPU 21 may determine whether a remaining number of information devices 13 that are allowed to be registered is greater than or equal to "1" (step S73).

The CPU 21 may determine whether an information device is allowed to be registered based on registerable information. The registerable information may represent a remaining number of a specified total number of information devices that are allowed to be registered using a particular PIN. For example, if 100 is set as the number information (representing the total number of information devices 13 that are allowed to be registered using a particular PIN) and ten (10) information devices have been registered, the server 11 may determine that the registerable information is 90 (representing that 10 information devices 13 have been registered and 90 more are allowed to be registered). After acquiring the registerable information, the CPU 21 may determine whether the registerable information is greater than or equal to "1" in order to determine whether the server should allow the information device 13 requesting a connection to be registered (step S73). More specifically, the CPU 21 may specify the PIN code which is included in the received connection request data, and the CPU 21 may acquire the number information associated with the specified PIN code in the first table 241. This number information may change as information devices 13 are registered, and thus, the number information may correspond to the registerable information as it may represent a remaining number of information devices that are allowed to be registered. Then, the CPU 21 may determine whether the registerable information corresponding to the number information is greater than or equal to "1" or not at step S73. The CPU 21 may determine that registerable information is not greater than or equal to "1", when the CPU 21 determines that the registerable information is "0" (representing that no more information devices are allowed to be registered using the received PIN code). In other words, when the CPU 21 determines that the registerable information is "0," the CPU 21 essentially determines that all the information devices 13 that are allowed to be registered using a particular PIN code have already been registered. The CPU 21 may execute step S11 of FIG. 4 again, when the CPU 21 determines that the number of the registerable information device 13 is not greater than or equal to "1" (step S73:NO).

The CPU 21 may store the device ID and the serial number associated with each other in the second table 242 (S83), when the CPU 21 determines that the registerable information is greater than or equal to "1" (step S73:YES). The stored device ID and the serial number are included in the received connection request data. The CPU 21 may update the registerable information by subtracting "1" from the registerable information (S85). The CPU 21 may determine whether the updated registerable information is equal to "zero" or not (step S87). The CPU 21 executes step S91, when the CPU 21 determines that the updated registerable information is not equal to "zero" (step S87:NO), that is, the CPU 21 determines that the updated registerable information is greater than or equal to "1". The CPU 21 may delete the PIN code associated with the specified number information from the first table 241 (step S89), when the CPU 21 determines that the updated registerable information is equal to "zero" (step S87:YES). The CPU 21 may transmit authentication information (e.g., token notification data) to the information device 13 which transmits device information response data (step S91 in FIG. 7 or step S521 in FIG. 3). The token notification data includes a token. The token may be necessary information for the information device 13 to communicate with the server 11. The CPU 21 may generate each token per each of the plurality of the information devices 13. The CPU 21 may execute step S11 of FIG. 4 again after performing step S91.

Alternatively, the CPU 21 may calculate a sum of the device IDs registered in the second table 242 to determine the number of information device 13 that have already been registered, when the CPU 21 determines that the specified effective time will come in the future, e.g., whether the specified effective time will come after the current time (step S71:YES). For example, if there are four device IDs in the second table 242 as shown in FIG. 2, the CPU may calculate that the sum of device IDs is four, and thus, determine that four information devices 13 have already been registered. The CPU 21 may determine the registerable information by comparing the specified number information (representing the total number of information devices 13 that are allowed to be registered) with the calculated sum of the device IDs (step S73). The CPU 21 may execute step S11 of FIG. 4 again, when the CPU 21 determines that the sum of the device IDs (representing the number of information devices 13 that have already been registered) equal to the total number of information devices 13 that are allowed to be registered (step S73:NO). The CPU 21 may store the device ID and the serial number in association with each other in the second table 242 (step S83) and may transmit the token notification data (step S91), when the CPU 21 determines that the sum of device IDs is less than or equal to the registerable information (step S73:YES).

As depicted in FIG. 4, the CPU 21 may determine that list request data is received from the information processing apparatus 12 (step S23), when the CPU 21 determines that the connect request data is not received (step S19:NO). The list request data may be transmitted from the information processing apparatus 12. The list request data may be used by the information processing apparatus 12, when the information processing apparatus 12 requests a list of the device ID(s) and the serial number(s) stored in the second table 242 for a particular account. The list request data may include the account information. The CPU 21 may execute a list response process (step S25) as depicted in FIG. 8, when the CPU 21 determines that the list request data is received from the information processing apparatus 12 (step S23:YES).

Figure 8:
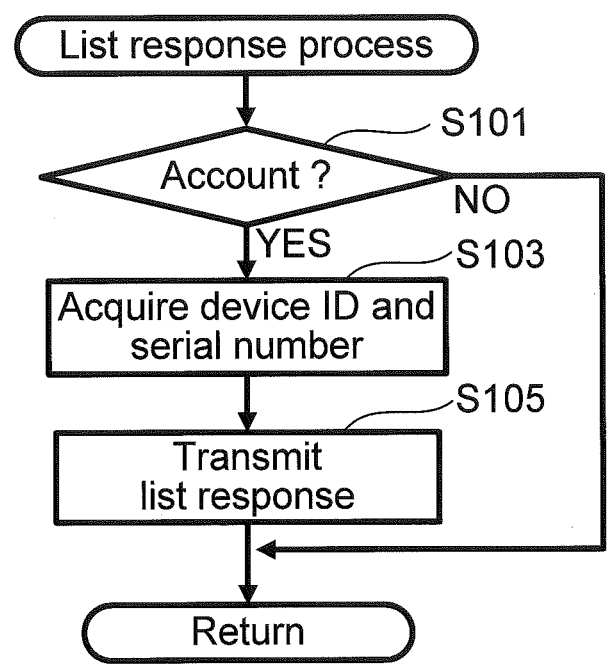
FIG. 8 is a flowchart depicting an example list response process according to one or more aspects of the disclosure.

With reference to FIG. 8, the list response process will be described. The CPU 21 may determine whether the account information is included in the received list request data or not (step S101). The CPU 21 may execute step S11 of FIG. 4 again, when the CPU 21 determines that the account information is not included in the received list request data (step S101:NO). When the CPU 21 determines that the account information is included in the received list request data (step S101:YES), the CPU 21 may acquire the device ID and the serial number associated with the included account information from the second table 242 (S103). The CPU 21 may transmit, to the information processing device 12 which transmits the list request data, list response data including the acquired device ID and the serial number (S105). The CPU 21 may execute step S11 of FIG. 4 again.

Figure 5:
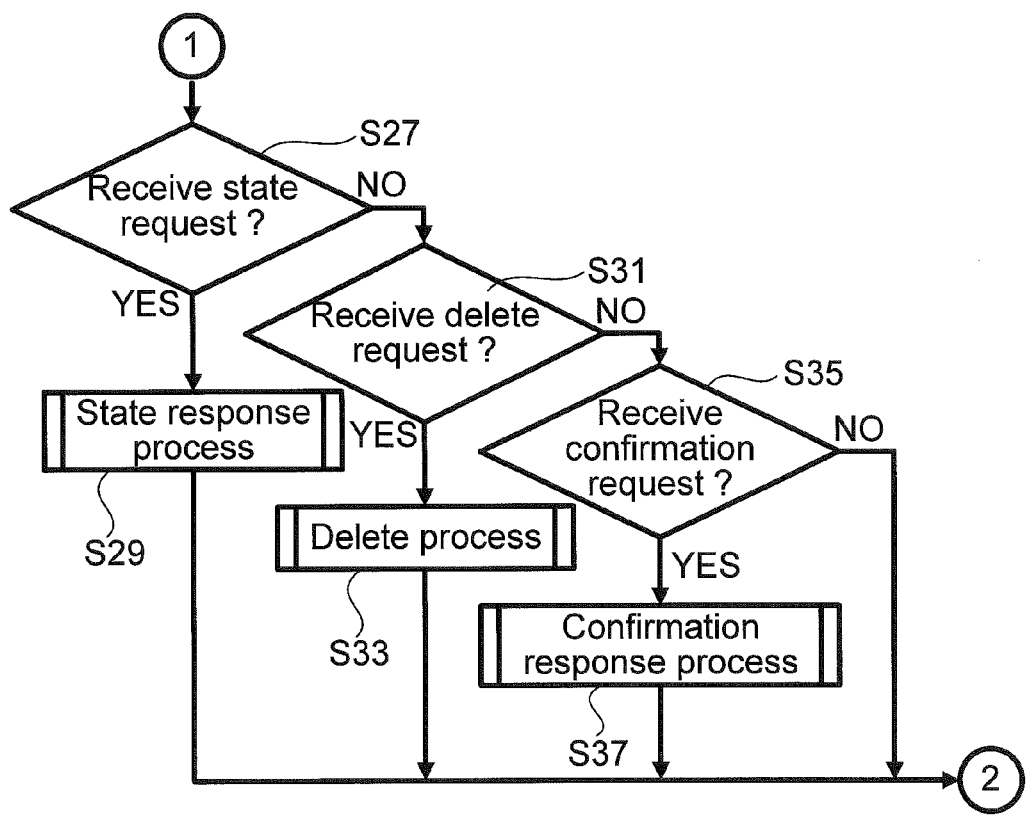
FIG. 5 is a flowchart depicting an example first process according to one or more aspects of the disclosure.

As depicted in FIG. 5, the CPU 21 may determine whether state request data is received from the information processing apparatus 12, when the CPU 21 determines that the list request data is not received (step S23:NO). The state request data may be transmitted from the information processing apparatus 12.

The state request data may be used by the information processing apparatus 12, when the information processing apparatus 12 requests to acquire the device state information stored in the information device 13 represented by the device ID in the second table 242. The state request data may include the device ID. The CPU 21 may execute a state response process (step S29) as depicted in FIG. 9, when the CPU 21 determines that the state request data is received (step S27:YES).

Figure 9:
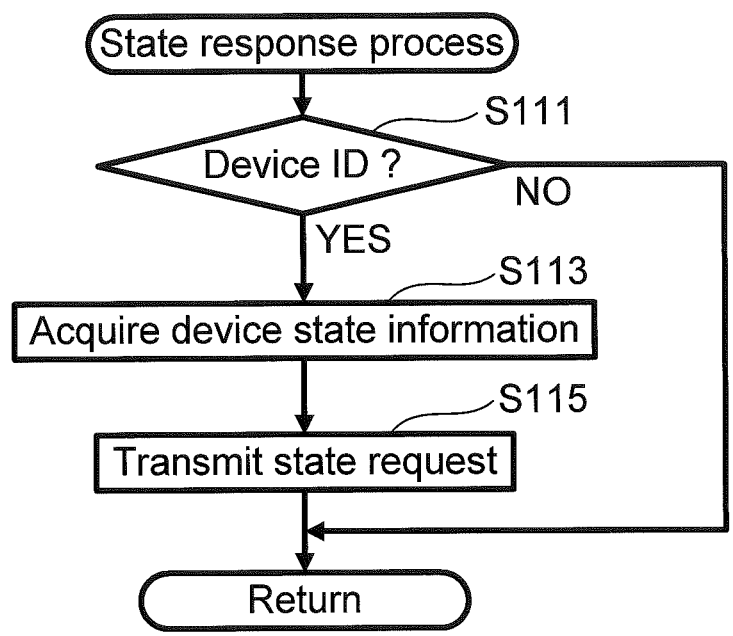
FIG. 9 is a flowchart depicting an example state response process according to one or more aspects of the disclosure.

With reference to FIG. 9, the state response process will be described. The CPU 21 may determine whether the device ID is included in the received state request data (step S111). The CPU 21 may execute step S11 of FIG. 4 again, when the CPU 21 determines that the device ID is not included in the received state request data (step S111: NO). When the CPU 21 determines that the device ID is included in the received state request data (step S111:YES), the CPU 21 communicates with the information device 13 represented by the included device ID, and acquires the device state information from the information device 13 represented by the included device ID (S113). The CPU 21 transmits, to the information processing apparatus 12 which transmits the state request data, state response data including the acquired device state information (S115). The CPU 21 may execute step S11 of FIG. 4 again after S115 is performed.

Figure 10:
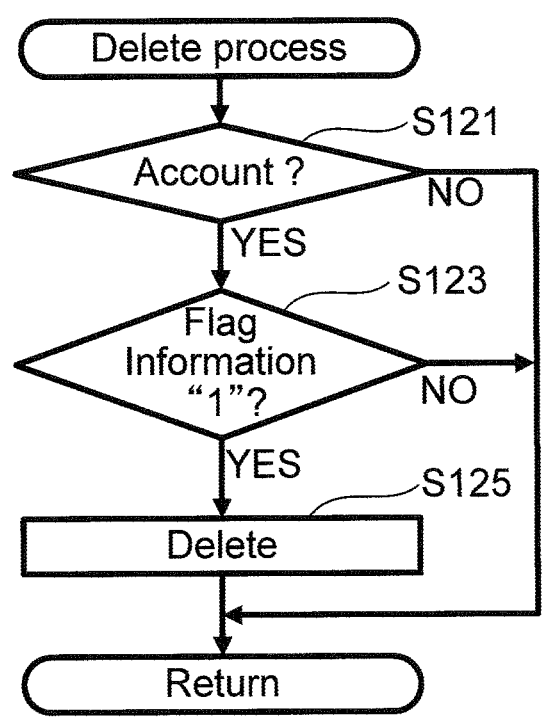
FIG. 10 is a flowchart depicting an example delete process according to one or more aspects of the disclosure.

The CPU 21 may determine whether delete request data is received from the information processing apparatus 12 or not (step S31), when the CPU 21 determines that the state request data is not received (step S27:NO). The delete request data is transmitted from the information processing apparatus 12. The delete request data is used by the information processing apparatus 12, when the information processing apparatus 12 requests to delete the device ID from the second table 242. The delete request data may include the account information and the device ID. The CPU 21 may execute a delete process (step S33) as depicted in FIG. 10, when the CPU 21 determines that the delete request data is received (step S31:YES). Alternatively, the account information might not be included in the delete request data.

With reference to FIG. 10, the delete process will be described. The CPU 21 may determine whether the account information is included in the received delete request data or not (step S121). The CPU 21 may execute step S11 of FIG. 4 again, when the CPU 21 determines that the account information is not included in the received delete request data (step S121:NO). The CPU 21 may determine whether the flag information, in the first table 241 and associated with the included device ID in the delete request data is "1", or not (step S123), when the CPU 21 determines that the account information is included in the delete request data (step S121:YES). The CPU 21 might not be allowed to delete the device ID from the second table 242, when the CPU 21 determines that the flag information is "0". On the other hand, the CPU 21 may be allowed to delete the device ID from the second table 242, when the CPU 21 determines that the flag information is "1". The CPU executes step S11 of FIG. 4 again, when the CPU 21 determines that the flag information is "0" (step S123:NO). The CPU 21 may delete, from the second table 242, the device ID included in the delete request data (step S125), when the CPU 21 determines that the flag information is "1" (step S123:YES). The CPU 21 may execute step S11 of FIG. 4 again after performing step S125. In this embodiment, the flag information "1" corresponds to the device ID of the information device 13 which can be used freely by an individual. The flag information "0" corresponds to the device ID of the information device 13 which may be set up based on the contract (e.g., an information device 13 managed by a dealer or other seller). Accordingly, even though the device ID of the information device 13 is associated with the system user's account, when the information device 13 is restricted by the contract, the system user cannot delete the device ID of the information device 13. As described above, the sever 11 can acquire the device state information from all of the plurality of the information devices 13 related to the contract adequately.

The CPU 21 may determine whether confirmation request data is received from the information processing apparatus 12 (S35), when the CPU 21 determines that the delete request data is not received (step S31:NO). The confirmation request data may be received by the server 11 from the information processing apparatus 12. The confirmation request data is used by the information processing apparatus 12, when the information processing apparatus 12 requests the PIN code and the number information stored in the first table 241, as described below. The confirmation request includes the account information. The CPU 21 may execute the confirmation response process (step S37) as depicted in FIG. 11, when the CPU 21 determines that the confirmation request data is received (step S35:YES).

Figure 11:
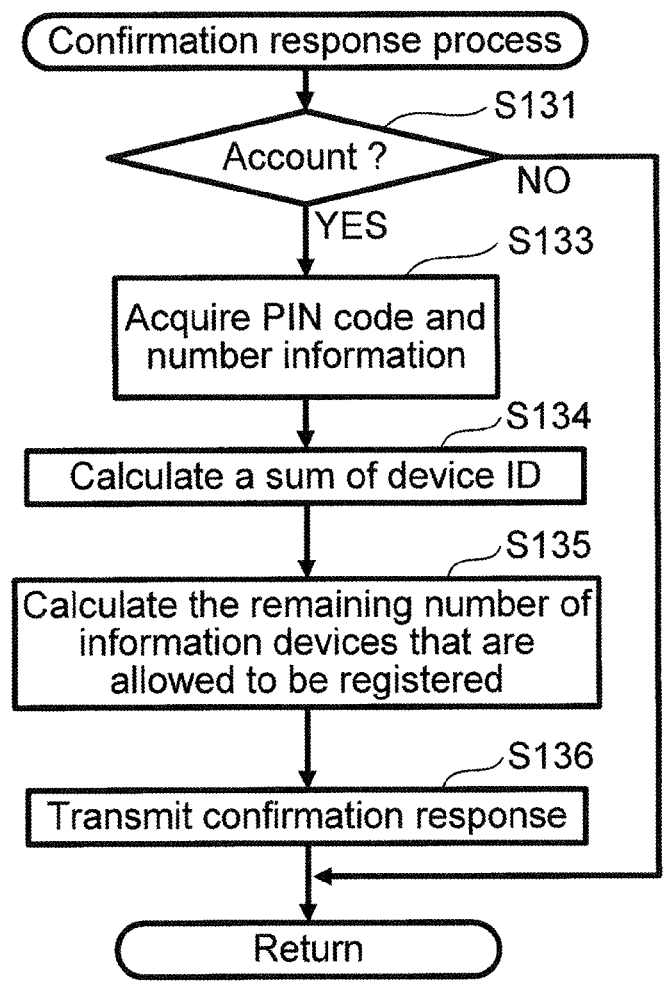
FIG. 11 is a flowchart depicting an example confirmation response process according to one or more aspects of the disclosure.

With reference to FIG. 11, the confirmation response process will be described. The CPU 21 may determine whether the account information is included in the received confirmation request data or not (step S131). The CPU 21 may execute step S11 of FIG. 4 again, when the CPU 21 determines that the account information is not included in the received confirmation request data (step S131:NO). When the CPU 21 determines that the account information is included in the received confirmation request data (step S131:YES), the CPU 21 may acquire, from the first table 241, the PIN code and the number information associated with the included account information in the confirmation request data (step S133). The CPU 21 may calculate a sum of the device IDs in the second table 242 (S134). More specifically, the CPU 21 may calculate a sum of the device IDs associated with the included account information (S134). The CPU 21 may calculate the remaining number of registerable information devices 13 (represented by the registration information) by subtracting the calculated sum at step S134 from the total number of regsiterable information devices 13 represented by the acquired number information at step S133 (S135). The CPU 21 may transmit, to the information processing apparatus 12 which transmits the confirmation request data, confirmation response data including the PIN code and the number information acquired at step S133 (step S136). The CPU 21 may execute step S11 of FIG. 4 again, when the CPU 21 determines that the confirmation request data is not received (step S35:NO).

With reference to FIG. 12, the second process executed by the CPU 31 of the information processing apparatus 12 will be described. The CPU 31 may read a program from the HDD 36 or other memory device and execute the second process, when the information processing apparatus 12 is turned on. The CPU 31 may execute the program, whenever a power source of the information processing apparatus 12 is turned on.

First, the CPU 31 may generate a web page for causing a browser of the terminal device to display a screen for receiving an instruction of requesting generation of a PIN code. The CPU 31 may generate two web pages for causing the browser to display two screens, e.g., one screen for the dealer, and another screen for the device user. The two web pages may be associated with different URLs. The terminal device acquires the generated web page, and displays the generated web page by using the browser. The device user or the dealer inputs an instruction for generating a PIN code into the terminal device. The CPU 31 may acquire, from the terminal device, the instruction inputted into the terminal device.

The CPU 31 may determine whether an instruction for generating a PIN code is acquired via the screen for the dealer or not. The CPU 31 may generate a web page for selecting one or more clients by the dealer. The CPU 31 may determine that the instruction for generating a PIN code is acquired via the screen for the dealer (step S201:YES). The terminal device may acquire the generated web page and displays the generated web page by using the browser. The CPU 31 may execute a process of requesting the server 11 to generate the first PIN code with respect to an account related to the selected client (step S203), based on the selecting of one or more clients by the dealer by using the generated web page.

The CPU 31 may determine whether an instruction for generating a PIN code is acquired via the screen for the device user or not. The CPU 31 may execute a process of requesting the server 11 to generate the second PIN code with respect to an account of the device user (step S207), when the CPU 31 determines that the instruction for generating a PIN code is acquired via the screen for the device user (step S205:YES). The CPU 31 may execute step S209, when the CPU 31 determines that the instruction for generation a PIN code is not acquired via the screen for the device user (step S205:NO).

The CPU 31 may request to generate the PIN code (the first PIN code or the second PIN code) at step S203 or step S207, as described below. The CPU 31 may transmit account generate request data to the server 11 in order to request the server 11 to generate an account, when the CPU 31 receives a request to generate a user account from the terminal device of a device user or dealer. The server 11 may generate an account at step S503 of FIG. 3, when the server 11 receives the account generate request data. The CPU 21 of the server 11 may transmit, to the information processing apparatus 12, account notification data including account information generated at step S505 of FIG. 3.

The CPU 31 of the information processing apparatus 12 receives the account notification data from the server 11. The account notification data is transmitted from the server 11. The CPU 31 may generate a web page configured to display a data entry screen for inputting the number information, the period information, and the serial number. The terminal device may acquire the generated web page and displays the generated web page by using the browser of the terminal device. The system user (e.g., the device user or the dealer) may input, into the terminal device, the number of the information device 13 which can be registered using the PIN code. The system user (e.g., the device user or the dealer) may input, into the terminal device, the effective period of the PIN code. The system user (e.g., the device user or the dealer) may input, into the terminal device, the serial number of the information device 13 which will be registered with the PIN code. The CPU 31 may generate PIN acquire request data. The PIN acquire request data may include the account information included in the account notification data, the number information inputted into the terminal device, the period information inputted into the terminal device, and the serial number inputted into the terminal device. The CPU 31 may include the flag information "0" in PIN acquire request data, when the CPU 31 determines that the PIN code is requested by the dealer. The CPU 31 may include the flag information "1" in the PIN acquire request data, when the CPU 31 determines that the PIN code is requested by the device user. The CPU 31 may generate the PIN acquire request data including the number information indicating "1" and the period information indicating "15 minutes", when the CPU 31 requests to generate the second PIN code (step S207). The CPU 31 may transmit, to the server 11, the PIN acquire request data as depicted in step S507 of FIG. 3.

As depicted in step S509 of FIG. 3, the server 11 may generate the first PIN code or the second PIN code, when the server 11 receives the PIN acquire request data. As depicted step S511 of FIG. 3, the server 11 may transmit, to the information processing apparatus 12, the PIN response data including the generated first PIN code or the generated second PIN code. The information processing apparatus 12 may receive the PIN response data from the server 11. The CPU 31 may generate a downloadable file configured to cause the information device 13 to store the first PIN code, and store the generated downloadable file in HDD 36, when the CPU 31 determines that the first PIN code is included in the received PIN response data. The CPU 31, for example, may cause the browser of the terminal device to display the second PIN code, when the CPU 31 determines that the second PIN code is included in the received PIN response data. More specifically, for example, the CPU 31 may generate a web page configured to display the PIN code in the browser of the terminal device. The terminal device may acquire the generated web page, and displays the generated web page by using the browser of the terminal device.

The acquired first PIN code or the acquired second PIN code by the information processing apparatus 12 may be stored on the information device 13, in the registering procedure by the system user (the device user or the dealer). For example, the dealer accesses the information processing apparatus 12 by using the terminal device. The terminal device of the dealer may download the downloadable file registering the first PIN code. The dealer may set the downloadable file to the information device 13. The dealer, for example, stores the downloadable file in the flash memory 44 or the RAM 43 of the information device 13, by using the terminal device. The CPU 41 of the information device 13 can communicate with the server 11, by transmitting, to the server 11, the connection request data including the first PIN code stored in the flash memory 44 or the RAM 43. Alternatively, the device user may access the information processing apparatus 12 by using the terminal device. Upon this access, the terminal device may display the second PIN code in the browser of the terminal device. The device user can understand the second PIN code displayed in the browser, and the device user may input the second PIN code into the information device 13 via the input device 45 of the information device 13. The CPU 41 of the information device 13 may store the inputted second PIN code in the flash memory 44 or the RAM 43. The CPU 41 of the information device 13 can communicates with the server 11, by transmitting, to the server 11, the connection request data including the second PIN code which is stored in the flash memory 44 or the RAM 43. However, a method for storing the PIN code in the flash memory of the information device 13 or the RAM 43 of the information device 13, is not limited to the above-mentioned method.

The CPU 31 may acquire current time from the OS of the information processing apparatus 12 (step S204), after receiving the first PIN code or the second PIN code. As described below, the CPU 31 may determine whether a predetermined cycle for executing a confirmation process (as depicted S227) has come or not, based on the acquired current time. The CPU 31 may cause the browser of the terminal device to display at least one option (e.g., a selection button) for selecting at least one of "display a list", "delete", and "issue a bill" (step S208). For example, at step S208, the CPU 31 may generate a web page for displaying the selection button in the browser of the terminal device. The terminal device may acquire the generated web page, and displays the generated web page by using the browser of the terminal device. When the terminal device determines that an operation for selecting the displayed selecting button is received, the terminal device may transmit the selected information to the information processing apparatus 12.

The CPU 31 may determine whether an operation for selecting "displaying a list" is received from the terminal device or not, based on the received information from the terminal device (step S209). The CPU 31 may execute a process for generating a list (step S211), when the CPU 31 determines that an operation for selecting "displaying a list" is received from the terminal device (step S209:YES). The detail of this process will be described. The CPU 31 may generate the list request data including the received account information received at step S203 or step S207, and transmits the generated list request data to the server 11. The server 11 may transmit, to the information processing apparatus 12, the list response data including the device ID and serial number, when the server 11 determines that the list request data is received. The CPU 31 of the information processing apparatus 12 may acquire the device ID and the serial number included in the received list response data. The CPU 31 may display the acquired device ID and the acquired serial number in the browser of the terminal device.

For example, the CPU 31 may select, from one or more of the serial numbers inputted into the terminal device at step S203 or step S207, a serial number other than the serial number included in the received list response data, and may display the selected serial number in the browser of the terminal device. By displaying the selected serial number in the browser of the terminal device, the system user can understand the serial number of the information device 13 which is unregistered (e.g., not registered by using the PIN code). The CPU 31 may transmit, to the server 11, the confirmation request data including the account information. The CPU 31 may display, in the browser of the terminal device, the PIN code and the number information included in the confirmation request data which is transmitted from the server 11. The system user can confirm the remaining number of registerable information devices 13 by using the requested PIN code.

Alternatively, the CPU 31 may notify the terminal device of the PIN code and the number information, by sending an e-mail including the PIN code and the remaining number of registerable information devices 13 (e.g., represented by the registerable information) to an e-mail address of the terminal device. The e-mail address may be pre-stored in the HDD 36.

The CPU 31 may determine whether an operation for selecting "delete" is received from the terminal device or not, based on the received information from the terminal device (step S217). The CPU 31 may execute a process for requesting to delete the device ID (step S219), when the CPU 31 determines that an operation for selecting "delete" is received from the terminal device (step S217:YES). The details of this process will be described below. The CPU 31 may read the account information from the HDD 36. The CPU 31 may cause the browser of the terminal device to display an input screen for inputting the device ID. More specifically, the CPU 31 may generate a web page for displaying the input screen in the browser of the terminal device. The terminal device may acquire the generated web page and displays the generated web page in the browser. When the terminal device receives an operation for inputting the device ID into the terminal device, the terminal device may transmit the inputted device ID to the information processing apparatus 12. The CPU 31 may transmit, to the server 11, the delete request data including the read account information from the HDD 36, and the received device ID from the terminal device. The server 11 may delete, from the second table 242, the device ID included in the delete request data, when the server 11 determines that the delete request data is received. The server 11 can delete, from the second table 242, only the device ID associated with the flag information "1".

The CPU 31 may determine whether an operation for selecting "issuing a bill" is received from the terminal device or not, based on the received information from the terminal device (step S221). The CPU 31 may execute a process for issuing a bill (step S223), when the CPU 31 determines that an operation for selecting "issuing a bill" is received from the terminal device (step S221:YES). The details of this process will be described below. The CPU 31 may read, from the HDD 36, the device ID which is stored in the HDD 36 at the confirmation process (step S227) as described below. The device ID stored at the confirmation process is the device ID of the information device 13 corresponding to the serial number inputted by the system user. The CPU 31 may transmit, to the server 11, state request data including the read device ID. The CPU 21 of the server 11 may transmit, to the information processing apparatus 12, state response data including the device state information, when the CPU 12 of the server 11 determines that the state request data is received. The CPU 31 of the information processing apparatus 12 may generate a bill based on the device state information included in the received state response data. The system user can get the generated bill from the information processing apparatus 12 based on the device state information, because the system user can designate the information device 13 for acquiring the device state information, by using the serial number without using the device ID.

The CPU 31 may determine whether a timing for executing the confirmation process has come or not based on the acquired current time at step S204 (step S225), when the CPU 31 determines that an operation for selecting "issuing a bill" is not received by the terminal device (step S221:NO). The CPU 31 may execute the confirmation process at a pre-determined cycle. The CPU 31 may execute step S201 again, when the CPU 31 determines that the timing for executing the confirmation process has not come (step S225:NO). The CPU 31 executes the confirmation process for confirming the device ID of the information device 13 which can communicate with the server 11 by registering the PIN code (step S227), when the CPU 31 determines that the timing for executing the confirmation process has come (step S225:YES). The detail of this process will be described below. The CPU 31 may transmit, to the server 11, the list request data including the account information indicative of any one of a plurality of accounts. The server 11 may transmit, to the information processing apparatus 12, the list response data including the device ID and the serial number associated with the account information included in the list request data, when the server 11 receives the list request data. The CPU 31 of the information processing apparatus 12 may acquire the device ID and the serial number included in the received list response data. The CPU 31 of the information processing apparatus 12 may acquire the serial number which is inputted into the terminal device at step S203 or step S207. The CPU 31 may acquire, from the list included in the list response data, the device ID associated with the serial number which is inputted into the terminal device at step S203 or step S207. The CPU 31 may store the acquired device ID associated with the serial number in the HDD 36.

Figure 13:
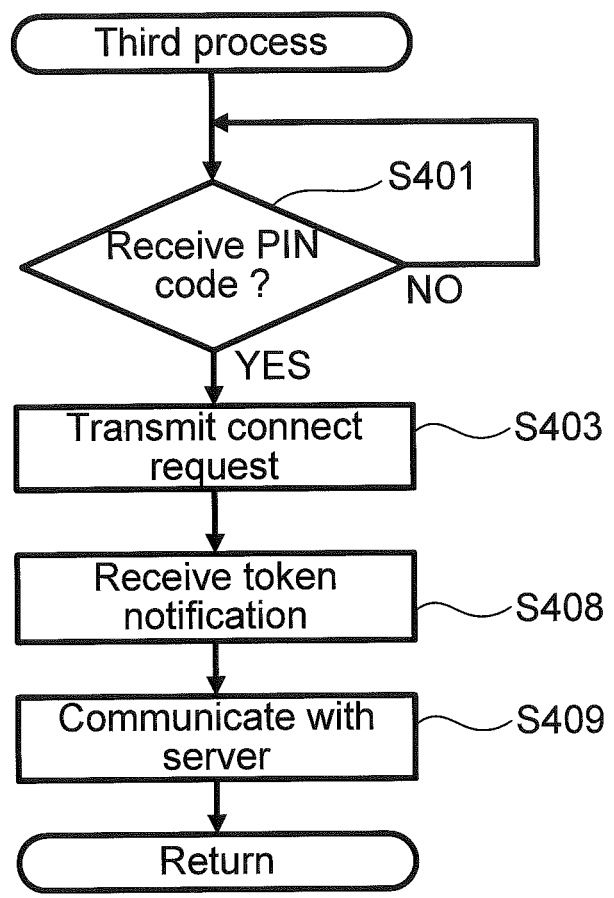
FIG. 13 is a flowchart depicting an example third process according to one or more aspects of the disclosure.

With reference to FIG. 13, the third process executed by the CPU 41 of the information device 13 will be described. The CPU 41 may read a program from the flash memory 44 or other memory and execute the third process, when a power source of the information device 13 is turned on.

The CPU 41 may determine whether the PIN code is received or not (step S401). The CPU 41 may, for example, receive the PIN code by reading a file stored in the terminal device via the network 2 or via a cable. The CPU 41 may receive the PIN code by reading a file stored in the flash memory 44 of the information device 13 or the RAM 43 of the information device 13. Alternatively, for example, the CPU 41 may receive the PIN code from inputs entered via the input device 45. The CPU 41 may execute step S401 again, when the CPU 41 determines that the PIN code is not received (step S401:NO). The CPU 41 may acquire the device ID which is stored in ROM 42, and the serial number which is stored in the flash memory 44, when the CPU 41 determines that the PIN code is received (step S401:YES). The CPU 41 may generate the connection request data including the PIN code received at step S401, the acquired device ID, and the acquired serial number. The CPU 41 may transmit the generated connect request data to the server 11 (step S403).

The server 11 may transmit the token notification data to the information device 13. The CPU 41 of the information device 13 may receive the token notification data from the server 11 (step S408). The CPU 41 may acquire information indicating token from the received token notification data, and specify the token. The CPU 41 may start to communicate with the server 11 by using the token (step S409). After executing step S408, whenever the CPU 41 transmits data to the server 11 for example at step S409, the CPU 41 adds the specified token to a header of the transmitted data.

As explained above, the dealer who manages the plurality of the information devices 13 can input the first PIN code, as a common PIN code among the plurality of the information devices 13, into each of the plurality of the information device 13. The dealer can register the PIN code easily, because the dealer do not have to register, each of the plurality of the information devices 13 with a respective one of a plurality of PIN codes. The CPU 21 can set the effective period of the first PIN code to be longer than or equal to the effective period of the second PIN code. The dealer can register the first PIN code with the plurality of the information device 13 within the effective time of the first PIN code, even though, the dealer requires longer time to perform the registering procedure by using the first PIN code.

The longer the effective period of the PIN code is, the more likely the PIN code may be decoded by another. For this reason, the CPU 21 sets the first digit number of the first PIN code to be longer than the second digit number of the second PIN code. Therefore, the first PIN code is less likely to be decoded by another, because the first digit number of the first PIN code is longer, even though the effective period of the first PIN code is longer. Accordingly, the longer digit number can keep the first PIN code highly-confidential, even though the CPU 21 sets a longer effective time for the first PIN code.

Configurations of servers, apparatuses, devices and flowcharts of various processes depicted in the drawings do not limit the aspects of the disclosure but merely illustrate the aspects of the disclosure. As described above, the CPU 21 may store, in the first table 241, the number information and the period information which is received from the information processing apparatus 12 (step S63). The CPU 21 also determines whether the token notification data is transmitted or not based on the number information and the period information stored in the first table 241 (step S71 and step S73), when the CPU 21 receives connection request data. For example, the CPU 21 may stores the number information "100" (indicating one-hundred information devices) and the period information "30-day" associated with the first PIN code in the first table 241, when the CPU 12 generates the first PIN code. The CPU 21 may stores the number information "1" (indicating one information device) and the period information "15-minute" associated with the second PIN code in the first table 241, when the CPU 12 generates the second PIN code.

The first digit number of the first PIN code and the second digit number of the second PIN code may be variable according to the total number of registerable information devices 13 (represented by the number information) and the effective period (represented by the period information). Alternatively, the CPU 21 may determine that the longer the first period and/or the greater the first number is, the longer the first digit number of the first PIN code is. A specific method of determining the first digit number and the second digit number will be described below. The CPU 21 may store, in HDD 26, a table which associates the first digit number and the second number with each of a plurality of pairs of the number information and the period information. The CPU 21 may specify, in the table, the first digit number associated with the number information and the period information which are acquired from the PIN acquire request data, and may generate the first PIN code of the specified first digit number, when the CPU 21 generates the first PIN code at step S53. In a similar way, the CPU 21 may specify, in the table, the second digit number associated with the number information and the period information which are acquired from the PIN acquire request data, and may generate the second PIN code of the specified second digit number, when the CPU 21 generates the second PIN code at step S59. Alternatively, the CPU 21 may determine that the effective period of the first PIN code and the effective period of the second PIN code are the same period. The CPU 21 may determine that the first digit number and the second digit number are the same digit number.

Alternatively, the CPU 21 may store, in the HDD 26, a first formula for calculating the first digit number, and a second formula for calculating the second digit number. The CPU 21 may calculate the first digit number by using the first formula, based on the number information and period information which are acquired from the PIN acquire request data, when the CPU 21 generates the first PIN code at step S53. The CPU 21 may generate the first PIN code using the calculated first digit number. In a similar way, the CPU 21 may calculate the second digit number by using the second formula, based on the number information and period information which are acquired from the PIN acquire request data, when the CPU 21 generates the second PIN code at step S59. The CPU 21 may generate the second PIN code using the calculated second digit number.

As described above, the CPU 21 may authenticate the information device 13 by using the PIN code and may transmit, to the information device 13, the token notification data, when the CPU 21 determines that the connect request data is received from the information device 13 within the effective period (step S71:YES). The CPU 21 may receive the connection request data and may authenticate the information device 13 by using the PIN code, even though the CPU 21 determines that the connect request data is not received from the information device 13 within the effective period. For example, the CPU 21 may set a limitation on communicating with the information device 13 (e.g., a limitation on a type of data which is allowed to communicate with the information device 13, or a limitation on an amount of communications with the information device 13), when the CPU 21 determines that the connection request data is not received from the information device 13 within the effective period.

As described above, the first table 241 associates the flag information "0" or the flag information "1" with each of the PIN code, when the server 11 registers the PIN code. For example, the terminal device may request the server 11 to allow an intended account to delete the device ID. When the CPU 21 of the server receives the request, the CPU 21 of the server 11 may store, in the first table 241, the flag information "1" associated with the intended account which is requested from the terminal device.

As described above, the information processing apparatus 12 acquires, from the registered device ID in the list included in the list response data, the device ID associated with the serial number which is inputted into the terminal device at step S203 or step S207, and stores the acquired device ID in the HDD 36. The information processing apparatus 12 may cause the browser of the terminal device to display all device IDs and serial numbers included in the received list response data. The information processing apparatus 12 may further cause the browser of the terminal device to display a selection button for selecting the device ID and the serial number which are displayed in the browser of the terminal device. The information processing apparatus 12 may acquire the selected device ID and the serial number, and may store the acquired device ID and the acquired serial number in the HDD 36, when the information processing apparatus 12 determines that an operation for selecting the device ID and the serial number is received by the terminal device. In this case, the serial number may not be inputted into the terminal device.

The PIN acquire request data, which is transmitted from the information processing apparatus 12 to the server 11, might not include the device ID and the serial number, and the PIN acquire request data may be data that just requests to acquire the PIN code. Alternatively, the PIN acquire request data may include either the device ID or the serial number, and the PIN acquire request data may not include both of the device ID and the serial number. In this case, the CPU 21 of server 11 can identify the device ID associated with the serial number by referring to the second table 242, when the CPU 21 of the server 11 receives the PIN acquire request data. In this case, the CPU 21 of server 11 can also identify the serial number associated with the device ID by referring to the second table 242, when the CPU 21 of the server 11 receives the PIN acquire request data. Or, for example, the CPU 21 of the server 11 can identify the serial number by referring to the second table 242, when the PIN acquire request data includes the device ID. For example, the CPU 21 of the server 11 can identify the device ID by referring to the second table 242, when the PIN acquire request data includes the serial number.

What is claimed is:

1. A system comprising:
a server; and
a plurality of information devices,
wherein the server comprises:
at least one first processor; and
a first memory storing user identification information for a plurality of users and first computer-readable instructions therein that, when executed by the at least one first processor, cause the server to:
receive, from a requesting device, a code request comprising particular user identification information for a particular user among the plurality of users and one of:
first information with first number information indicating a first number; and
second information;
determine whether the code request comprises the first information or the second information;
in response to determining that the code request comprises the first information:
generate a first authentication code;
transmit the generated first authentication code to the requesting device; and
store, in a memory in association with each other, the particular user identification information, the first authentication code, and first registerable number information indicating the first number;
in response to determining that the code request comprises the second information:
generate a second authentication code;
transmit the generated second authentication code to the requesting device; and
store, in the memory in association with each other, the particular user identification information, the second authentication code, and second registerable number information indicating a second number that is different from the first number;
wherein each of the plurality of information devices comprises:
at least one second processor; and
a second memory configured to store second computer-readable instructions therein that, when executed by the at least one second processor, cause a corresponding information device to:
transmit, to the server, a connection request comprising a particular authentication code corresponding to one of the first authentication code and the second authentication code;
wherein the first computer-readable instructions, when executed by the at least one first processor, cause the server to:
receive, from a first information device among the plurality of information devices, the connection request and device identification information identifying the first information device;
   determine whether particular registerable number information corresponding to the particular authentication code indicates that more than one information device is allowed to be registered, wherein the particular registerable number information corresponds to one of the first registerable number information and the second registerable number information and the particular registerable number information is stored in the memory in association with the particular authentication code; and
   in response to determining that the particular registerable number information indicates that more than one information device is allowed to be registered:
      store, in the memory in association with the particular authentication code, the device identification information;
      decrease a particular registerable number indicated by the particular registerable number information; and
      transmit authentication information to the first information device to allow the first information device to communicate with the server, and
   wherein the second computer-readable instructions cause the first information device to:
   receive the authentication information from the server; and
   communicate with the server using the received authentication information.

2. A non-transitory computer-readable medium storing computer-readable instructions that, when executed by at least one processor, cause a server to:
   receive, from a requesting device, a code request comprising particular user identification information for a particular user among a plurality of users and one of:
      first information, with first number information indicating a first number; and
      second information;
   determine whether the code request comprises the first information or the second information;
   in response to determining that the code request comprises the first information:
      generate a first authentication code;
      transmit the generated first authentication code to the requesting device; and
      store, in a memory in association with each other, the particular user identification information, the first authentication code, and first registerable number information indicating the first number;
   in response to determining that the code request comprises the second information:
      generate a second authentication code;
      transmit the generated second authentication code to the requesting device; and
      store, in the memory in association with each other, the particular user identification information, the second authentication code, and second registerable number information indicating a second number that is different from the first number;
   receive, from a first information device among a plurality of information devices, a connection request, comprising a particular authentication code, and device identification information identifying the first information device, wherein the particular authentication code comprises one of the first authentication code and the second authentication code;
   determine whether particular registerable number information corresponding to the particular authentication code indicates that more than one information device is allowed to be registered, wherein the particular registerable number information corresponds to one of the first registerable number information and the second registerable number information and the particular registerable number information is stored in the memory in association with the particular authentication code; and
   in response to determining that the particular registerable number information indicates that more than one information device is allowed to be registered:
      store, in the memory in association with the particular authentication code, the device identification information;
      decrease a particular registerable number indicated by the particular registerable number information; and
      transmit authentication information to the first information device to allow the first information device to communicate with the server.

3. The non-transitory computer-readable medium according to claim 2,
   wherein the connection request comprises the device identification information identifying the first information device.

4. The non-transitory computer-readable medium according to claim 2,
   wherein transmitting of the authentication information comprises transmitting authentication information to the first information device to allow the first information device to transmit, to the server, device state information representing a state of the first information device in response to determining that the first information device is allowed to be registered.

5. The non-transitory computer-readable medium according to claim 4,
   wherein the device state information represents an amount of printing performed by the first information device or a state of a consumable supply of consumer goods of the first information device, and
   wherein the first information device comprises a print mechanism and controller that controls the print mechanism to print using the consumable supply.

6. The non-transitory computer-readable medium according to claim 2,
   wherein storing of the first authentication code comprises storing first effective period information in association with the first authentication code and the first registerable number information, the first effective period information indicating a first effective period;
   wherein storing of the second authentication code comprises storing second effective period information in association with the second authentication code and the second registerable number information, the second effective period information indicating a second effective period; and
   wherein the computer-readable instructions, when executed by the at least one processor, further cause the server to:
      in response to receiving the connection request, determine whether the connection request is received within a particular effective period indicated by particular effective period information, the particular effective period information comprising one of the first effective period information and the second effective period information; and store, in the memory, the particular effective period information in association with the particular authentication code.

7. The non-transitory computer-readable medium according to claim 6,
wherein the first effective period is longer than the second effective period.

8. The non-transitory computer-readable medium according to claim 2,
wherein the first authentication code comprises a first number of digits;
wherein the second authentication code comprises a second number of digits; and
wherein the second number of digits is less than the first number of digits.

9. The non-transitory computer-readable medium according to claim 2,
wherein the first authentication code comprises a first number of digits,
wherein the computer-readable instructions, when executed by the at least one processor, further cause the server to in response to determining that the code request comprises the first information, store first effective time period information in association with the particular user identification information, the first authentication code, and first registerable number information, the first effective time period information indicating a first effective time period,
wherein the second authentication code comprises a second number of digits less than the first number of digits,
wherein the computer-readable instructions, when executed by the at least one processor, further cause the server to, in response to determining that the code request comprises the second information, store second effective time period information in association with the particular user identification information, the second authentication code, and second registerable number information, the second effective time period information indicating a second effective time period that is shorter than the first effective time period,
wherein the computer-readable instructions, when executed by the at least one processor, further cause the server to, in response to receiving the connection request, determine whether the connection request is received within a particular effective period indicated by particular effective period information stored in the memory in association with the particular authentication code, the particular effective period information comprising one of the first effective period information and the second effective period information, and
wherein whether the particular registerable number information indicates that more than one information device is allowed to be registered is determined in response to determining that the connection request is received within the particular effective period.

10. The non-transitory computer-readable medium according to claim 2, wherein the computer-readable instructions, when executed by the at least one processor, further cause the server to:
store, in the memory, the first information in association with the particular user identification information, the first authentication code, and the first registerable number information;
store, in the memory, the second information in association with the particular user identification information, the second authentication code, and the second registerable number information;
store, in the memory, the device identification information in association with the particular user identification information and a particular request, the particular request comprising one of the first information and the second information and associated with the particular authentication code;
receive a delete request comprising specific device identification information; and
determine to keep the specific device information in the memory when the particular request, which is associated with the particular authentication code, comprises the first data, and to delete the specific device identification information from the memory when the particular request, which is associated with the particular authentication code, comprises the second information.

11. The non-transitory computer-readable medium according to claim 10, wherein the computer-readable instructions, when executed by the at least one processor, further cause the server to:
delete the specific device identification information from the memory in response to determining to delete the specific device identification information.

12. The non-transitory computer-readable medium according to claim 2,
wherein the second number is one.

13. A server comprising;
at least one processor; and
a memory storing user identification information for a plurality of users and computer-readable instructions therein that, when executed by the at least one processor, cause the server to:
receive, from a requesting device, a code request comprising particular user identification information for a particular user among the plurality of users and comprising one of:
first information with first number information indicating a first number; and
second information;
determine whether the code request comprises the first information or the second information;
in response to determining that the code request comprises the first information:
generate a first authentication code;
transmit the generated first authentication code to the requesting device; and
store, in a memory in association with each other, the particular user identification information, the first authentication code, and first registerable number information indicating the first number;
in response to determining that the code request comprises the second information:
generate a second authentication code;
transmit the generated second authentication code to the requesting device; and
store, in the memory in association with each other, the particular user identification information, the second authentication code, and second registerable number information indicating a second number that is different from the first number;
receive, from a first information device among a plurality of information devices, a connection request, comprising a particular authentication code, and device identification information identifying the first information device, wherein the particular authentication code comprises one of the first authentication code and the second authentication code;

determine whether particular registerable number information corresponding to the particular authentication code indicates that more than one information device is allowed to be registered, wherein the particular registerable number information corresponds to one of the first registerable number information and the second registerable number information and the particular registerable number information is stored in the memory in association with the particular authentication code; and in response to determining that the particular registerable number information indicates that more than one information device is allowed to be registered:

store, in the memory in association with the particular authentication code, the device identification information; and decrease a particular registerable number indicated by the particular registerable number information; and transmit authentication information to the first information device to allow the first information device to communicate with the server.

14. The server according to claim 13, wherein transmitting of the authentication information comprises transmitting authentication information to the first information device to allow the first information device to transmit, to the server, device state information representing a state of the first information device in response to determining that the first information device is allowed to be registered.

15. The server according to claim 13, wherein storing of the first authentication code comprises storing first effective period information in association with the first authentication code and the first registerable number information, the first effective period information indicating a first effective period;

wherein storing of the second authentication code comprises storing second effective period information in association with the second authentication code and the second registerable number information, the second effective period information indicating a second effective period; and wherein the computer-readable instructions, when executed by the at least one processor, further cause the server to:

in response to receiving the connection request, determine whether the connection request is received within a particular effective period indicated by particular effective period information, the particular effective period information comprising one of the first effective period information and the second effective period information; and store, in the memory, the particular effective period information in association with the particular authentication code.

16. The server according to claim 15, wherein the first effective period is longer than the second effective period.

17. The system according to claim 1, wherein the first number is greater than the second number.

18. The system according to claim 1, wherein the first computer-readable instructions, when executed by the at least one first processor, further cause the server to:

in response to determining that the particular registerable number information indicates that more than one information device is allowed to be registered, generate the authentication information uniquely for the first information device.

19. The system according to claim 1, wherein the first information device further comprises a print mechanism, and wherein the second computer-readable instructions further cause the first information device to:

control the print mechanism to print using a consumable supply of consumer goods; and after receiving the authentication information from the server, transmit, to the server, device state information representing an amount of printing performed by the first information device or a state of the consumable supply of the consumer goods.

20. The non-transitory computer-readable medium according to claim 2, wherein the first number is greater than the second number.

21. The non-transitory computer-readable medium according to claim 2, wherein the computer-readable instructions, when executed by the at least one processor, further cause the server to:

in response to determining that the particular registerable number information indicates that more than one information device is allowed to be registered, generate the authentication information uniquely for the first information device.

22. The non-transitory computer-readable medium according to claim 9, wherein the code request further comprises period information;

wherein the computer-readable instructions, when executed by the at least one processor, further cause the server to:

in response to receiving the code request comprising the first information and the period information, determine whether a particular time period indicated by the period information is within a first time period; and in response to receiving the code request comprising the second information and the period information, determine whether a particular time period indicated by the period information is within a second time period, wherein the first time period is longer than the second time period;

wherein transmission of the first authentication code to the requesting device and storing the first effective time period information is in response to determining that the particular time period is within the first time period, and wherein the first effective time period information indicates the particular time period as the first effective time period; and wherein transmission of the second authentication code to the requesting device and storing the second effective time period information is in response to determining that the particular time period is within the second time period, and wherein the second effective time period information indicates the particular time period as the second effective time period.

23. The server according to claim 14, wherein the device state information represents an amount of printing performed by the first information device or a state of a consumable supply of consumer goods of the first information device, the first information device comprising a print mechanism and controller that controls the print mechanism to print using the consumable supply.

\* \* \* \* \*